United States Patent
Gaitan et al.

(10) Patent No.: US 12,222,239 B2
(45) Date of Patent: Feb. 11, 2025

(54) CALIBRATION APPARATUS AND CALIBRATING A LASER DOPPLER VIBROMETER

(71) Applicant: Government of the United States of America, as represented by the Secretary of Commerce, Gaithersburg, MD (US)

(72) Inventors: Michael Gaitan, North Potomac, MD (US); Jon Clement Geist, Olney, MD (US); Benjamin James Reschovsky, Cabin John, MD (US); Akobuije Douglas Eziani Chijioke, Silver Spring, MD (US)

(73) Assignee: GOVERNMENT OF THE UNITED STATES OF AMERICA, AS REPRESENTED BY THE SECRETARY OF COMMERCE, Gaithersburg, MD (US)

( * ) Notice: Subject to any disclaimer, the term of this patent is extended or adjusted under 35 U.S.C. 154(b) by 0 days.

(21) Appl. No.: 18/410,271

(22) Filed: Jan. 11, 2024

(65) Prior Publication Data
US 2024/0271993 A1    Aug. 15, 2024

Related U.S. Application Data

(62) Division of application No. 17/336,964, filed on Jun. 2, 2021, now Pat. No. 11,906,350.
(Continued)

(51) Int. Cl.
*G01H 9/00*    (2006.01)
(52) U.S. Cl.
CPC .................. *G01H 9/002* (2013.01)

(58) Field of Classification Search
CPC ....................................................... G01H 9/002
(Continued)

(56) References Cited

U.S. PATENT DOCUMENTS 4,297,887 A    11/1981 Bucaro
4,659,224 A    4/1987 Monchalin
(Continued)

FOREIGN PATENT DOCUMENTS

CN       106124032         11/2016
CN       110849466 A *    2/2020     ............... G01H 9/00
(Continued)

OTHER PUBLICATIONS

Machine translation of CN 110849466 (Year: 2020).*
(Continued)

*Primary Examiner* — John E Breene
*Assistant Examiner* — Rose M Miller
(74) *Attorney, Agent, or Firm* — Office of Chief Counsel for National Institute of Standards and Technology

(57) ABSTRACT

A calibration apparatus for calibrating a laser Doppler vibrometer includes: a frequency shifter stage that: receives, from the laser Doppler vibrometer, primary laser light; produces frequency shifted light; communicates the frequency shifted light to a reflector; receives frequency shifted light reflected by the reflector; produces secondary light; and communicates the secondary light to the laser Doppler vibrometer, such that the laser Doppler vibrometer receives the secondary light from the frequency shifter stage and produces a synthetic velocity shift from the secondary light; and the reflector that receives and reflects the frequency shifted light back to the frequency shifter stage.

11 Claims, 16 Drawing Sheets

Related U.S. Application Data

(60) Provisional application No. 63/035,127, filed on Jun. 5, 2020.

(58) Field of Classification Search
USPC .......................................................... 73/657
See application file for complete search history.

(56) References Cited

U.S. PATENT DOCUMENTS

| | | | |
|---|---|---|---|
| 5,146,776 | A | 9/1992 | Twerdochlib et al. |
| 7,681,453 | B2 | 3/2010 | Turner et al. |
| 9,995,674 | B2 | 6/2018 | Prasad |
| 11,906,350 | B2 * | 2/2024 | Gaitan ............... G01H 9/00 |
| 2009/0299197 | A1 * | 12/2009 | Antonelli ............ A61B 5/113 |
| | | | 600/485 |

FOREIGN PATENT DOCUMENTS

| | | | |
|---|---|---|---|
| CN | 115420366 | 12/2022 | |
| CN | 115420367 | 12/2022 | |
| CN | 115507933 | 12/2022 | |
| JP | 2004361089 A | * 12/2004 | |
| JP | 32244778 | 1/2020 | |
| WO | WO-2004113998 A1 | * 12/2004 | ......... H04B 10/2587 |

OTHER PUBLICATIONS

Machine translation JP 2004361089 (Year: 2004).*
Machine translation of WO 2004113998 A1 (Year: 2004).*
Gaitan, M., et al.,"Characterization of Laser Doppler Vibrometers Using Acousto-Optic Modulators", Acta Imeko, 2020, p. 361-364, vol. 9 No. 5.
Nozato, H., et al.,"Calibration of laser Doppler vibrometer and laser interferometers in high-frequency regions using electro-optical modulator", Precision Engineering, 2021, p. 135-144, vol. 70.

* cited by examiner

CALIBRATION APPARATUS AND CALIBRATING A LASER DOPPLER VIBROMETER

CROSS REFERENCE TO RELATED APPLICATIONS

This patent application is a divisional of U.S. patent application Ser. No. 17/336,964 (filed Jun. 2, 2021), which claims benefit of U.S. Provisional Patent Application No. 63/035,127 (filed Jun. 5, 2020), each of which is hereby incorporated by reference in its entirety.

STATEMENT REGARDING FEDERALLY SPONSORED RESEARCH

This invention was made with United States Government support from the National Institute of Standards and Technology (NIST), an agency of the United States Department of Commerce. The Government has certain rights in the invention.

BRIEF DESCRIPTION

Disclosed is a calibration apparatus for calibrating a laser Doppler vibrometer, the calibration apparatus comprising: a bidirectional frequency shifter stage in optical communication with the laser Doppler vibrometer and that: receives, from the laser Doppler vibrometer, primary laser light comprising a primary frequency that propagates in a forward propagation direction to the bidirectional frequency shifter stage from the laser Doppler vibrometer; produces, from the primary laser light, frequency shifted light comprising a shifted frequency, such that the shifted frequency differs from the primary frequency; communicates, in a forward propagation direction, the frequency shifted light from the bidirectional frequency shifter stage to a reflector; receives, from the reflector, the frequency shifted light returned by the reflector and that propagates from the reflector to the bidirectional frequency shifter stage in a reverse propagation direction; produces secondary light comprising a secondary shifted frequency from the frequency shifted light reflected by the reflector, such that secondary shifted frequency differs from the shifted frequency and from the primary frequency; and communicates the secondary light to the laser Doppler vibrometer in the reverse propagation direction, such that the laser Doppler vibrometer receives the secondary light from the bidirectional frequency shifter stage and produces a synthetic velocity shift from the secondary light; and the reflector in optical communication with the bidirectional frequency shifter stage and that: receives frequency shifted light that propagates from the bidirectional frequency shifter stage to the reflector in the forward propagation direction; and reflects the frequency shifted light back to the bidirectional frequency shifter stage in the reverse propagation direction.

Disclosed is a calibration apparatus for calibrating a laser Doppler vibrometer, the calibration apparatus comprising: a monodirectional frequency shifter stage in optical communication with the laser Doppler vibrometer and that: receives, from the laser Doppler vibrometer, primary laser light comprising a primary frequency; produces, from the primary laser light, frequency shifted light comprising a shifted frequency, such that the shifted frequency differs from the primary frequency; communicates the frequency shifted light from the bidirectional frequency shifter stage to a reflector; the reflector in optical communication with the monodirectional frequency shifter stage and that: receives frequency shifted light from the monodirectional frequency shifter stage; and reflects the frequency shifted light from the monodirectional frequency shifter stage to a beam splitter; and the beam splitter in optical communication with the monodirectional frequency shifter stage and the reflector and that: receives the primary laser light from the laser Doppler vibrometer; communicates the primary laser light to the monodirectional frequency shifter stage; receives the frequency shifted light from the reflector; and communicates the frequency shifted light as secondary light to the laser Doppler vibrometer, such that the laser Doppler vibrometer receives the secondary light from the beam splitter and produces a synthetic velocity shift from the secondary light.

Disclosed is process for calibrating a laser Doppler vibrometer, the process comprising: receiving, by a bidirectional frequency shifter stage, primary laser light from a laser Doppler vibrometer, the primary laser light comprising a primary frequency and that is propagating in a forward propagation direction to the bidirectional frequency shifter stage from the laser Doppler vibrometer; producing, by the bidirectional frequency shifter stage from the primary laser light, frequency shifted light comprising a shifted frequency, such that the shifted frequency differs from the primary frequency; communicating, in a forward propagation direction, the frequency shifted light from the bidirectional frequency shifter stage to a reflector; receiving, by the reflector, the frequency shifted light that propagates from the bidirectional frequency shifter stage to the reflector in the forward propagation direction; reflecting, by the reflector, the frequency shifted light back to the bidirectional frequency shifter stage in the reverse propagation direction; receiving, by the bidirectional frequency shifter stage, the frequency shifted light reflected by the reflector that propagates from the reflector to the bidirectional frequency shifter stage in the reverse propagation direction; producing, by the bidirectional frequency shifter stage, secondary light comprising a secondary shifted frequency from the frequency shifted light reflected by the reflector, such that secondary shifted frequency differs from the shifted frequency and from the primary frequency; and communicating, the secondary light from the bidirectional frequency shifter stage, to the laser Doppler vibrometer in the reverse propagation direction, such that the laser Doppler vibrometer receives the secondary light from the bidirectional frequency shifter stage and produces a synthetic velocity shift from the secondary light.

Disclosed is a process for calibrating a laser Doppler vibrometer, the process comprising: receiving, by a monodirectional frequency shifter stage, primary laser light from the laser Doppler vibrometer, the primary laser light comprising a primary frequency; producing, by the monodirectional frequency shifter stage from the primary laser light, frequency shifted light comprising a shifted frequency, such that the shifted frequency differs from the primary frequency; communicating the frequency shifted light from the bidirectional frequency shifter stage to a reflector; receiving, by the reflector, the frequency shifted light from the monodirectional frequency shifter stage; reflecting, by the reflector, the frequency shifted light from the monodirectional frequency shifter stage to a beam splitter; receiving, by the beam splitter, the primary laser light from the laser Doppler vibrometer; communicating, by the beam splitter, the primary laser light to the monodirectional frequency shifter stage; receiving, by the beam splitter, the frequency shifted light from the reflector; and communicating the frequency shifted light as secondary light to the laser Doppler vibrometer from the beam splitter, such that the laser Doppler vibrometer receives the secondary light from the beam splitter and produces a synthetic velocity shift from the secondary light.

BRIEF DESCRIPTION OF THE DRAWINGS

The following description cannot be considered limiting in any way. With reference to the accompanying drawings, like elements are numbered alike.

DETAILED DESCRIPTION

Figure 1A:
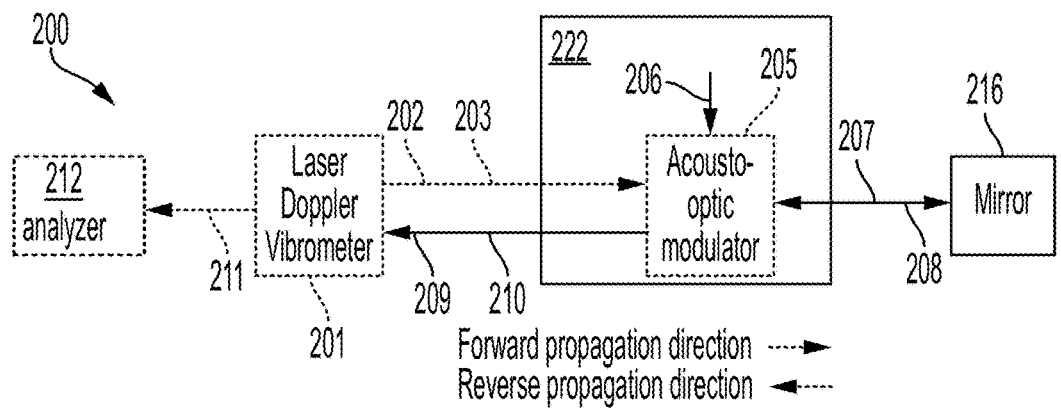
FIG. 1A shows a calibration apparatus that includes a bidirectional frequency shifter stage.

A detailed description of one or more embodiments is presented herein by way of exemplification and not limitation.

Mechanical vibration measurements can be obtained using a number of optical techniques. Such optical techniques can include laser speckle analysis, position-sensitive detector use, and holography. While execution of these optical techniques can vary considerably, many such optical techniques employ interferometers and rely on the Doppler effect. In accordance with the Doppler effect and its use in optical interferometric vibration measurements, light reflected from a moving surface experiences a frequency shift that is proportional to its instantaneous velocity.

For purposes of mechanical vibration measurements, data can be extracted from a Doppler-shifted beam. To determine the displacement of a mechanical vibration, the Doppler-shifted beam can be optically beaten with a reference beam. The phase of the beat signal is directly related to the displacement of the vibrating test object. To determine the velocity of a mechanical vibration, changes in the frequency of the beat signal can be measured.

A laser Doppler vibrometer (LDV) (also known as a laser Doppler velocimeter) includes an interferometer to measure mechanical vibration. With an LDV, one can infer target displacement or target velocity from interference between reflected light and a reference beam.

It has been discovered that calibration apparatus 200 described herein calibrates LDVs. Acousto-optic modulators frequency shift light from the LDV under test by a known quantity to create a synthetic velocity shift that is traceable to a time and frequency reference for fixed velocity shifts, and for varying velocity shifts, for example sinusoidal velocity shifts that occur in a conventional calibration that follows ISO Standard 16063-41. A conventional calibration that follows ISO Standard 16063-41 is based on a comparison-type measurement to a laser homodyne interferometer that is defined as the primary standard, resulting in the LDV as being considered as a secondary calibration. In contrast, calibration apparatus 200 and calibrating a laser Doppler vibrometer provide a traceable primary article and process for calibrating the LDV. The calibration apparatus 200 can simulate arbitrary mechanical excitation conditions to test and calibrate the LDV, including sweeping the synthetic vibration excitation frequency to directly characterize the bandwidth of an LDV together with its associated electronics. It is contemplated that operation can include free-space or fiber optical propagation of light that makes calibration apparatus 200 easy to use and portable. Beneficially, calibration apparatus 200 and calibrating a laser Doppler vibrometer also provide for characterizing the bandwidth of an LDV together with any connected data acquisition devices, control electronics, or amplifiers.

Calibration apparatus 200 calibrates laser Doppler vibrometer 201. In an embodiment, with reference to FIG. 1A, FIG. 1B, FIG. 1C, FIG. 4A, FIG. 4B, FIG. 5, FIG. 6, FIG. 7, and FIG. 12, calibration apparatus 200 includes: bidirectional frequency shifter stage 222 in optical communication with laser Doppler vibrometer 201 and that: receives, from laser Doppler vibrometer 201, primary laser light 202 including primary frequency 203 that propagates in a forward propagation direction to bidirectional frequency shifter stage 222 from laser Doppler vibrometer 201; produces, from primary laser light 202, frequency shifted light 207 comprising shifted frequency 208, such that shifted frequency 208 differs from primary frequency 203; communicates, in a forward propagation direction, frequency shifted light 207 from bidirectional frequency shifter stage 222 to reflector 216; receives, from reflector 216, frequency shifted light 207 reflected by reflector 216 and that propagates from reflector 216 to bidirectional frequency shifter stage 222 in a reverse propagation direction; produces secondary light 209 including secondary shifted frequency 210 from frequency shifted light 207 reflected by reflector 216, such that secondary shifted frequency 210 differs from shifted frequency 208 and from primary frequency 203; and communicates secondary light 209 to laser Doppler vibrometer 201 in the reverse propagation direction, such that laser Doppler vibrometer 201 receives secondary light 209 from bidirectional frequency shifter stage 222 and produces synthetic velocity shift 211 from secondary light 209; and reflector 216 in optical communication with bidirectional frequency shifter stage 222 and that: receives frequency shifted light 207 that propagates from bidirectional frequency shifter stage 222 to reflector 216 in the forward propagation direction; and reflects frequency shifted light 207 back to bidirectional frequency shifter stage 222 in the reverse propagation direction.

In an embodiment, calibration apparatus 200 includes laser Doppler vibrometer 201 in optical communication with acousto-optic modulator 205 and that produces primary laser light 202 that propagates in the forward propagation direction to bidirectional frequency shifter stage 222 and receives secondary light 209 that propagates in the reverse propagation direction from bidirectional frequency shifter stage 222 to laser Doppler vibrometer 201.

In an embodiment, bidirectional frequency shifter stage 222 is optically interposed between laser Doppler vibrometer 201 and mirror 216.

In an embodiment, calibration apparatus 200 includes analyzer 212 in electronic communication with laser Doppler vibrometer 201 and that receives synthetic velocity shift 211 from laser Doppler vibrometer 201, wherein analyzer 212 determines a calibration of laser Doppler vibrometer 201 from synthetic velocity shift 211.

In an embodiment, calibration apparatus 200 bidirectional frequency shifter stage 222 includes acousto-optic modulator 205 that: receives primary laser light 202; receives frequency drive signal 206; and produces frequency shifted light 207 from primary laser light 202, based on frequency drive signal 206.

In an embodiment, bidirectional frequency shifter stage 222 includes a plurality of acousto-optic modulators 205, wherein acousto-optic modulators 205 are connected optically in serial to one another, such that an optical input of each acousto-optic modulator 205 is an optical output of another acousto-optic modulator 205 in bidirectional frequency shifter stage 222, except for first acousto-optic modulator 205.1 that receives primary laser light 202.

In an embodiment, with reference to FIG. 2A, FIG. 2B, FIG. 2C, FIG. 3, FIG. 5, FIG. 6, FIG. 7, FIG. 8, and FIG. 9, calibration apparatus 200 includes: monodirectional frequency shifter stage 223 in optical communication with laser Doppler vibrometer 201 and that: receives, from laser Doppler vibrometer 201, primary laser light 202 including primary frequency 203; produces, from primary laser light 202, frequency shifted light 207 including shifted frequency 208, such that shifted frequency 208 differs from primary frequency 203; communicates frequency shifted light 207 from monodirectional frequency shifter stage 223 to reflector 216; reflector 216 in optical communication with monodirectional frequency shifter stage 223 and that: receives frequency shifted light 207 from monodirectional frequency shifter stage 223; and reflects frequency shifted light 207 from monodirectional frequency shifter stage 223 to beam splitter 215; and beam splitter 215 in optical communication with monodirectional frequency shifter stage 223 and reflector 216 and that: receives primary laser light 202 from laser Doppler vibrometer 201; communicates primary laser light 202 to monodirectional frequency shifter stage 223; receives frequency shifted light 207 from reflector 216; and communicates frequency shifted light 207 as secondary light 209 to laser Doppler vibrometer 201, such that laser Doppler vibrometer 201 receives secondary light 209 from beam splitter 215 and produces synthetic velocity shift 211 from secondary light 209.

In an embodiment, calibration apparatus 200 includes laser Doppler vibrometer 201 in optical communication with acousto-optic modulator 205 of monodirectional frequency shifter stage 223 and that produces primary laser light 202 and receives secondary light 209 from beam splitter 215.

In an embodiment, monodirectional frequency shifter stage 223 is optically interposed between laser Doppler vibrometer 201 and reflector 216.

In an embodiment, calibration apparatus 200 includes analyzer 212 in electronic communication with laser Doppler vibrometer 201 and that receives synthetic velocity shift 211 from laser Doppler vibrometer 201 as result of laser Doppler vibrometer 201 received secondary light 209 from monodirectional frequency shifter stage 223 via beam splitter 215, wherein analyzer 212 determines a calibration of laser Doppler vibrometer 201 from synthetic velocity shift 211.

In an embodiment, monodirectional frequency shifter stage 223 includes acousto-optic modulator 205 that: receives primary laser light 202; receives frequency drive signal 206; and produces frequency shifted light 207 from primary laser light 202, based on frequency drive signal 206.

In an embodiment, monodirectional frequency shifter stage 223 includes a plurality of acousto-optic modulators 205, wherein acousto-optic modulators 205 are connected optically in serial to one another, such that an optical input of each acousto-optic modulator 205 is an optical output of another acousto-optic modulator 205 in monodirectional frequency shifter stage 223, except for first acousto-optic modulator 205.1 that receives primary laser light 202.

Figure 8:
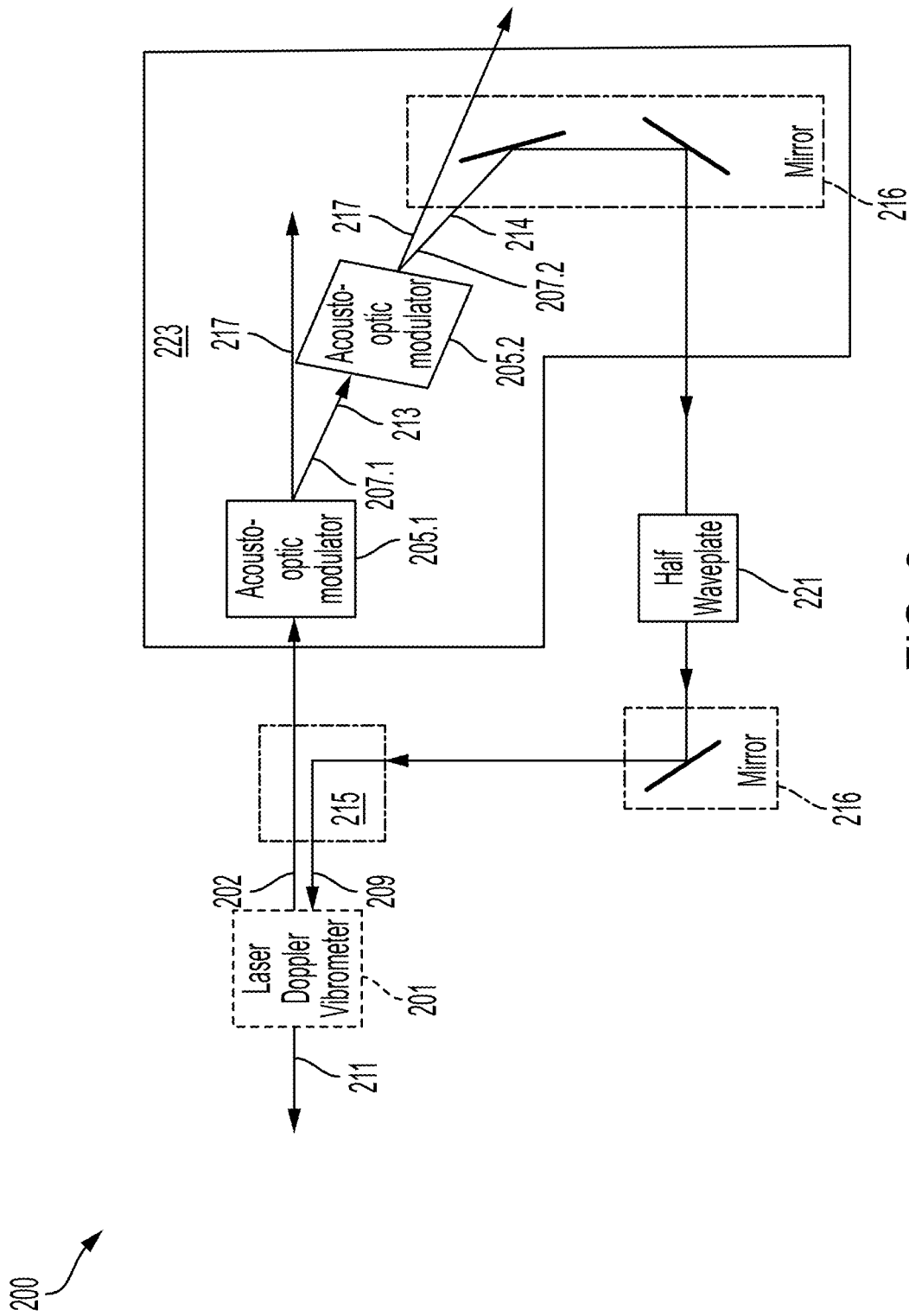
FIG. 8 shows a calibration apparatus including a monodirectional frequency shifter stage.
Figure 9:
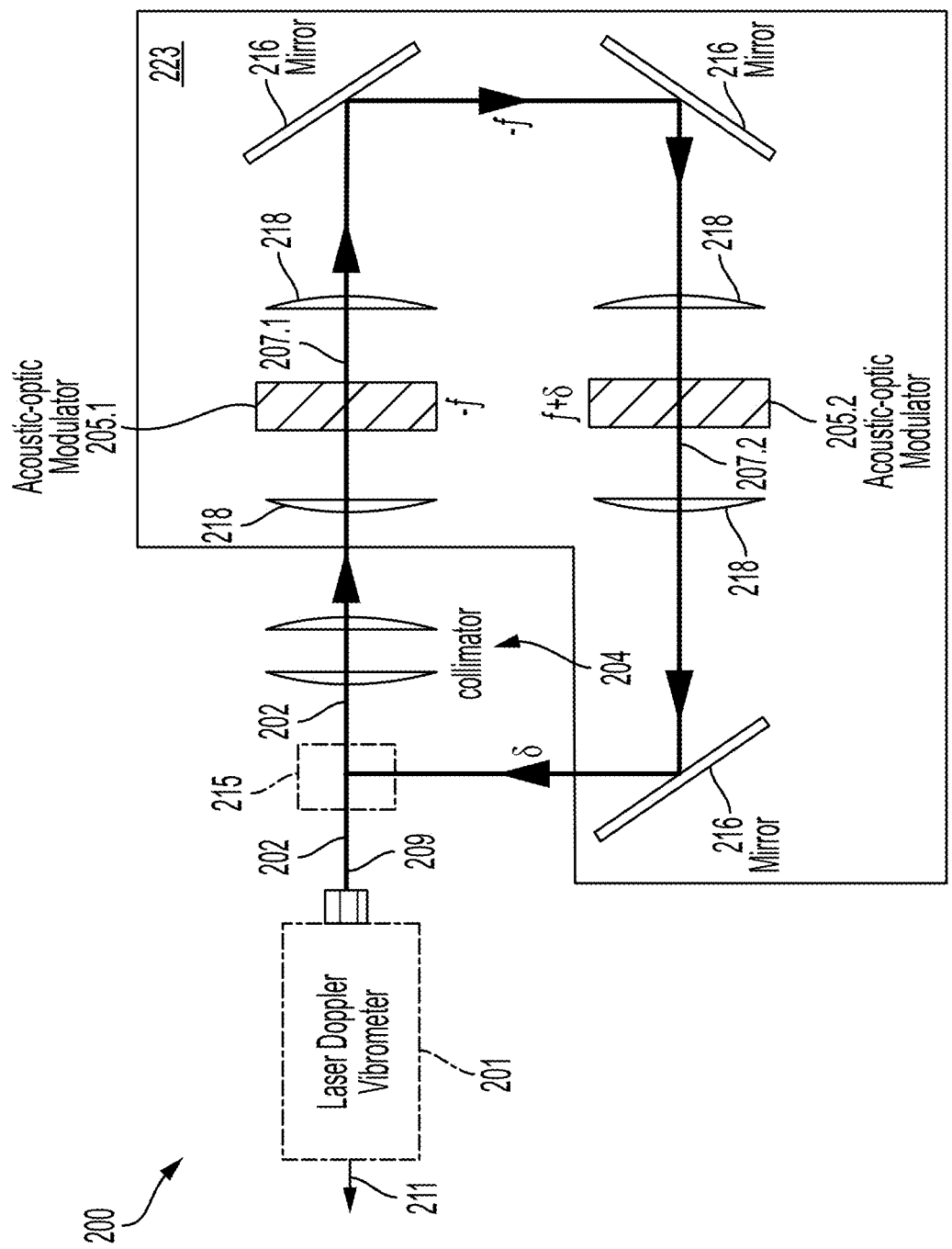
FIG. 9 shows a calibration apparatus including a monodirectional frequency shifter stage according to Example 1, wherein the monodirectional frequency shifter stage shifts the frequency of primary laser light by $\delta$, resulting in a synthetic velocity shift that can be calculated by the Doppler equation (1) and traceable by a calibrated frequency counter.
Figure 12:
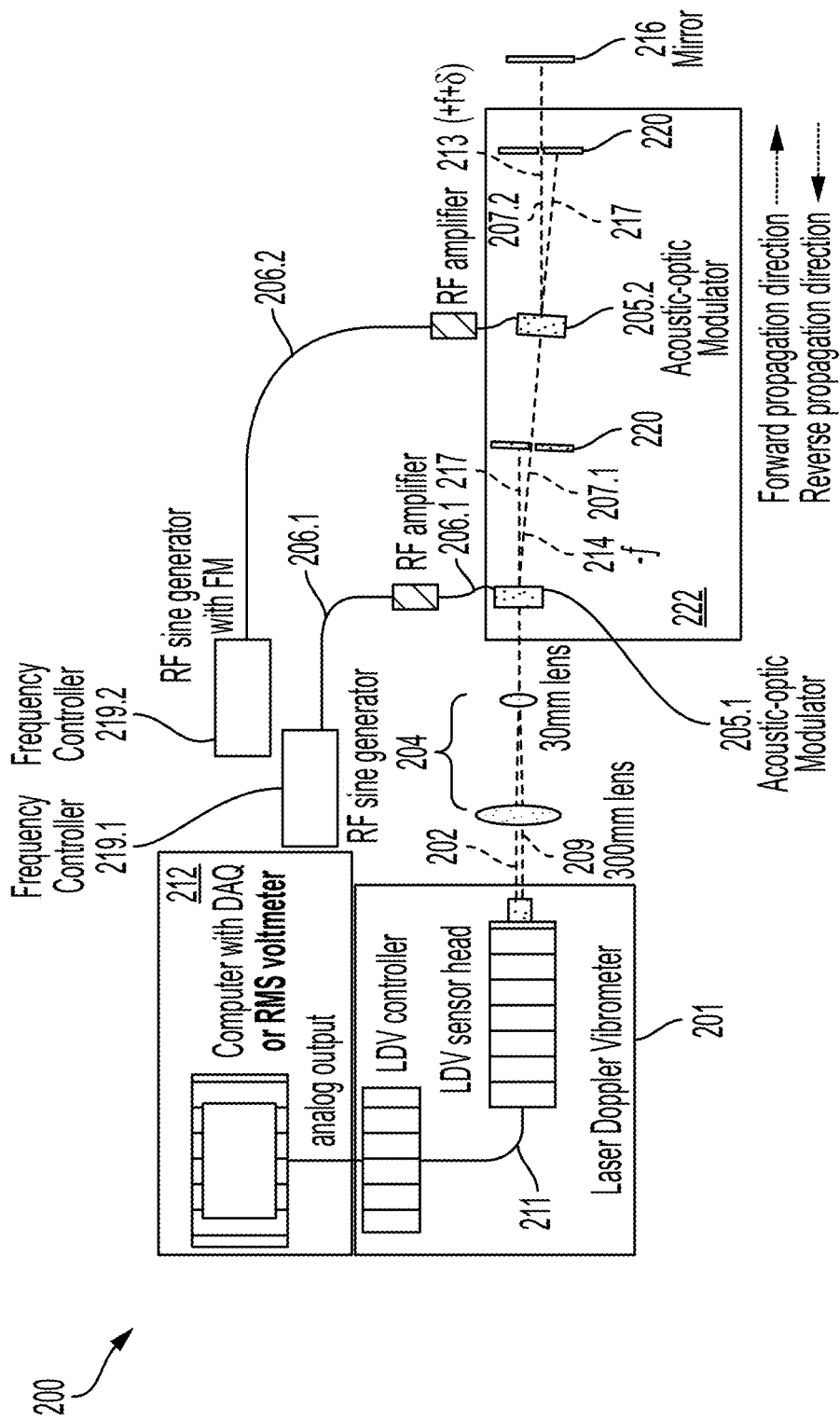
FIG. 12 shows a calibration apparatus including a bidirectional frequency shifter stage according to Example 2.

Calibration apparatus 200 can include various optical and electrical components. Any number of reflective members, optical combiners/splitters, light conditioning elements, and light path defining elements such as mirror 216, beam splitter 215, lens 218, iris 220, collimator 204, half waveplate 221, circulator, and the like can be used alone or in combination for alignment and directing propagation of various light into, within, or out of calibration apparatus 200. Such optical components can include dichroic mirrors or selectively reflective or transmissive mirrors. Exemplary configuration of such optical elements are shown in FIG. 8, FIG. 9, and FIG. 12.

Beam splitter 215 provides an optical communication path to couple light from multiple beam paths in calibration apparatus 200 to laser Doppler vibrometer 201. It is contemplated that propagation of light (e.g., primary laser light 202, frequency shifted light 207, secondary light 209, and the like) can occur in free-space or through a condensed medium such as an optical fiber.

Figure 5:
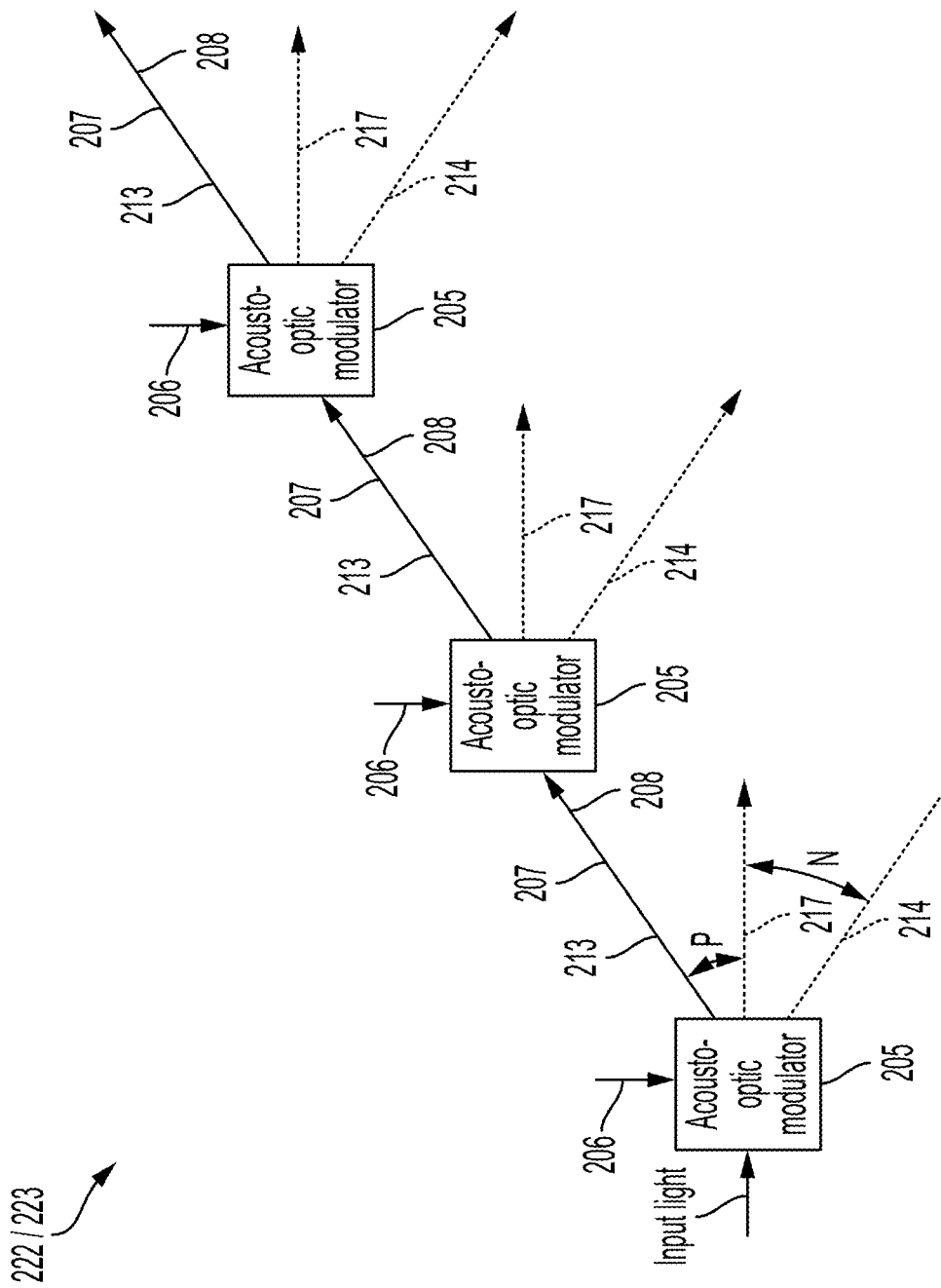
FIG. 5 shows a plurality of acousto-optic modulators 205 in optical communication for a bidirectional frequency shifter stage or monodirectional frequency shifter stage.
Figure 6:
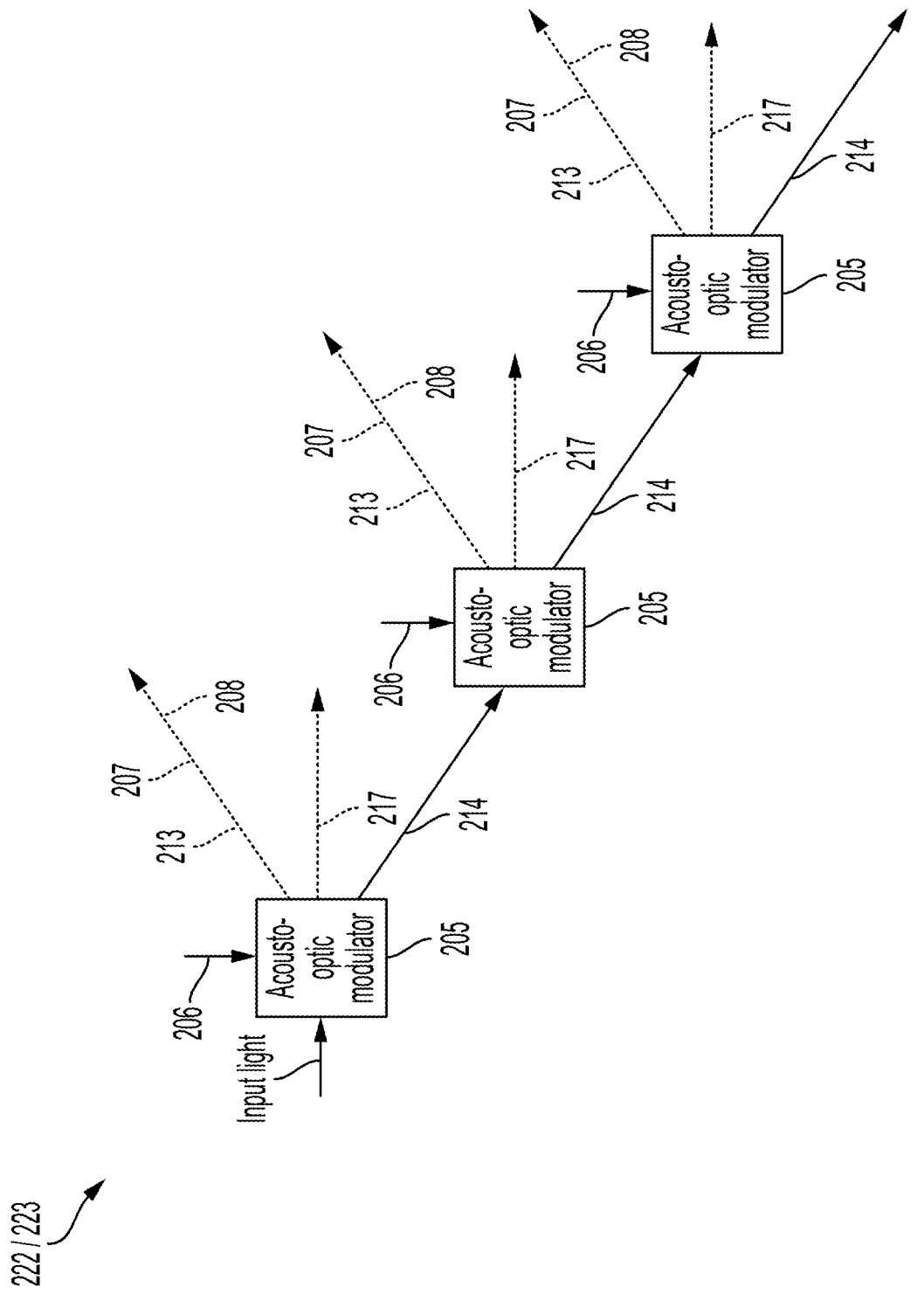
FIG. 6 shows a plurality of acousto-optic modulators 205 in optical communication for a bidirectional frequency shifter stage or monodirectional frequency shifter stage.
Figure 7:
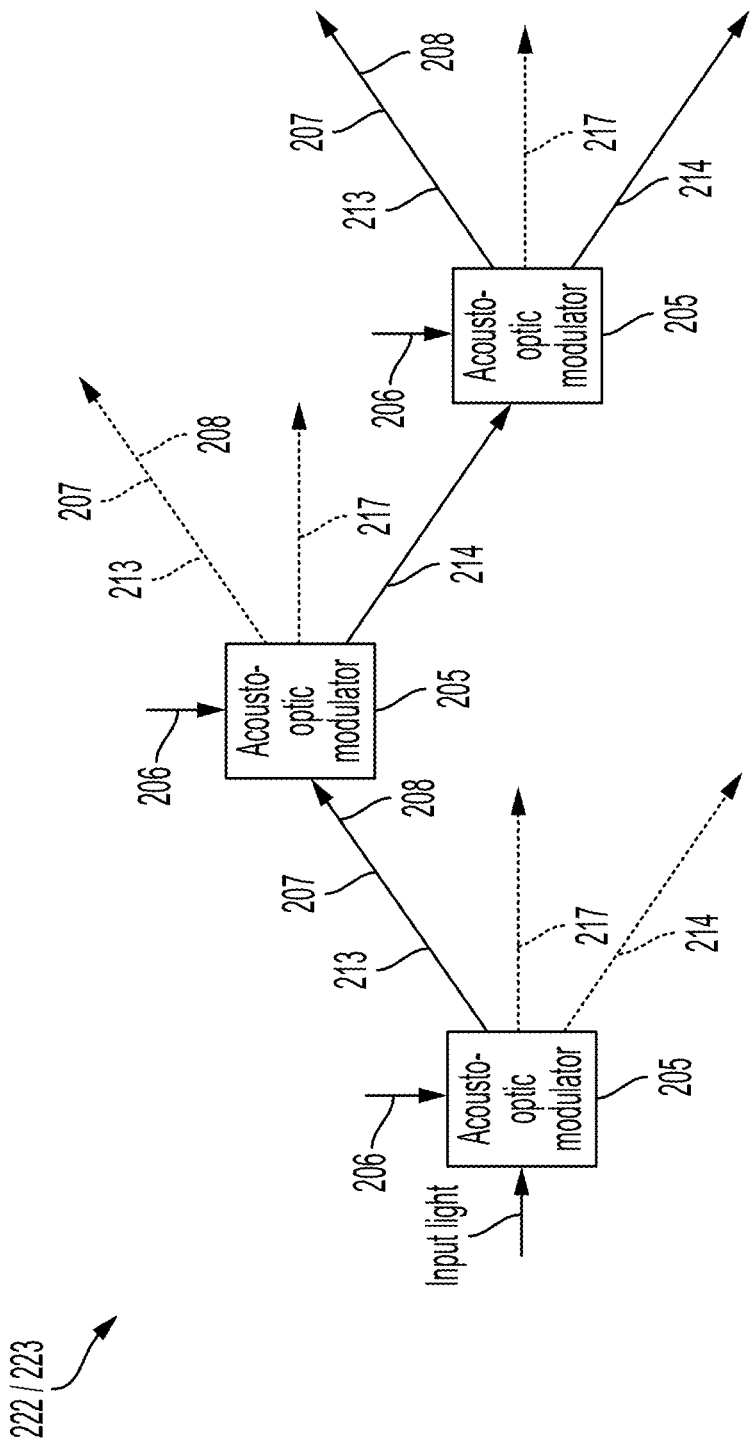
FIG. 7 shows a plurality of acousto-optic modulators 205 in optical communication for a bidirectional frequency shifter stage or monodirectional frequency shifter stage.

Advantageously, bidirectional frequency shifter stage 222 and monodirectional frequency shifter stage 223 can be used independently or in combination in calibration apparatus 200, and an plurality of calibration apparatus 200 can used in an array to calibrate multiple laser Doppler vibrometers 201. Further, calibration apparatus 200 is flexible in producing secondary light 209 with a selectivly tailorable secondary shifted frequency 210 by using an arbitrary number of acousto-optic modulators 205 that can be in optical communication in any number of ways such that each acousto-optic modulator 205 selects positive frequency shift component 213 as shown in FIG. 5. In an embodiment, shifted frequency 208 of acousto-optic modulator 205 is negative frequency shift component 214 as shown in FIG. 6. According to an embodiment, as shown in FIG. 7 any combination of positive frequency shift component 213 or negative frequency shift component 214 can be used among the plurality of acousto-optic modulators 205 in bidirectional frequency shifter stage 222 or monodirectional frequency shifter stage 223. As shown in FIG. 5, acousto-optic modulator 205 shifts positive frequency shift component 213 by positive angle P from neutral frequency shift component 217, and acousto-optic modulator 205 shifts negative frequency shift component 214 by negative angle N from neutral frequency shift component 217. The frequency shift (in either the positive or negative direction) provided by acousto-optic modulator 205 can be from 100 kHz to 5 GHz, specifically from 5 MHz to 2 GHZ, and more specifically form 40 MHz to 200 MHZ, in an input optical wavelength (e.g., of primary laser light 202) range from 50 nm to 100 μm, specifically from 200 nm to 12 μm, and more specifically from 500 nm to 2100 nm. It is contemplated that for a combination of acousto-optic modulators, the net frequency shift (in either the positive or negative direction) is from DC to 5 GHZ, specifically from DC to 100 MHZ, and more specifically from DC to 20 MHz.

Figure 1B:
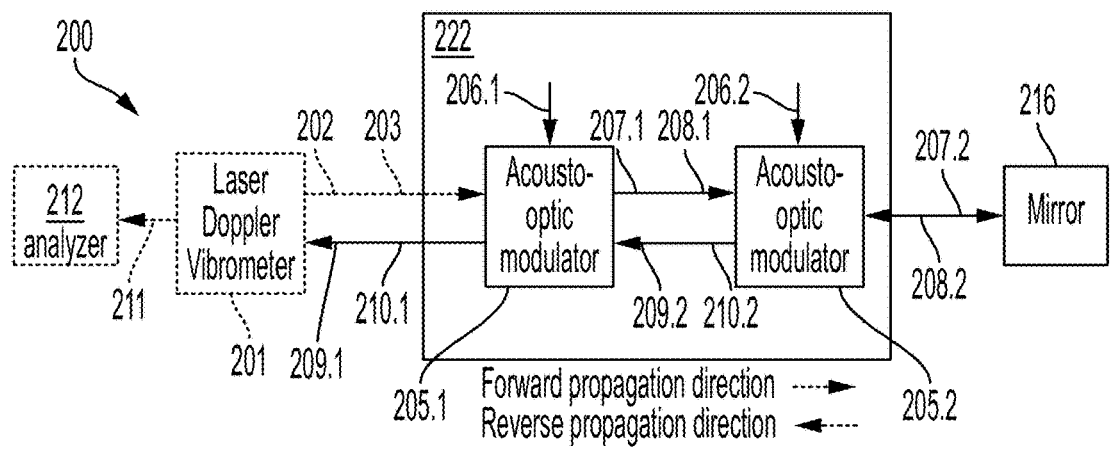
FIG. 1B shows a calibration apparatus that includes a bidirectional frequency shifter stage.
Figure 1C:
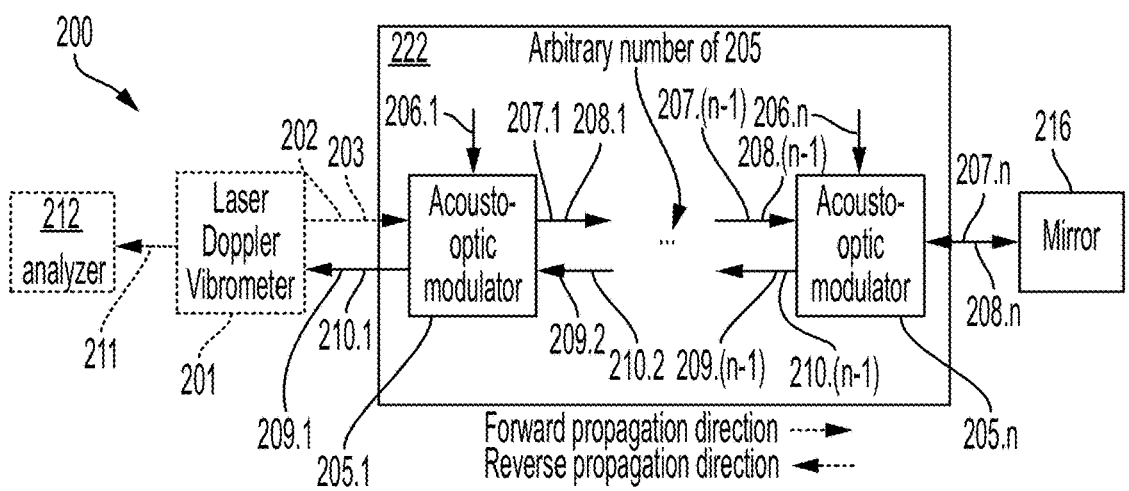
FIG. 1C shows a calibration apparatus that includes a bidirectional frequency shifter stage.

It should be appreciated that primary laser light 202 and frequency shifted light 207 differ by a frequency difference provided by the difference between primary frequency 203 and shifted frequency 208. Further, secondary light 209 is communicated to laser Doppler vibrometer 201 with a total frequency shift represented as secondary shifted frequency 210 after communication of light through calibration apparatus 200 that is subjected to frequency shift by the plurality of acousto-optic modulators 205 in calibration apparatus 200. In this respect, e.g., with reference to FIG. 1A, FIG. 1B, and FIG. 1C, bidirectional frequency shifter stage 222 includes acousto-optic modulator 205 in which a propagation path of light moving from laser Doppler vibrometer 201 to bidirectional frequency shifter stage 222 and from bidirectional frequency shifter stage 222 to mirror 216 is referred to as the forward propagation direction. Similarly, with reference to FIG. 1A, FIG. 1B, and FIG. 1C, a propagation path of light moving from mirror 216 to bidirectional frequency shifter stage 222 and from bidirectional frequency shifter stage 222 to laser Doppler vibrometer 201 is referred to as the reverse propagation direction. FIG. 1A shows bidirectional frequency shifter stage 222 that includes an accousto optic modulator. FIG. 1B shows bidirectional frequency shifter stage 222 that includes a plurality accousto optic modulators (e.g., two accousto optical modulators). FIG. 1C shows bidirectional frequency shifter stage 222 that includes a plurality of accousto optic modulator (e.g., an arbitrary number of accousto optic modulator indicated by 206.1, 206.n−1, 206.n, where n is an arbitrary integer).

Acousto-optic modulator 205 can be driven by frequency drive signal 206 that can be an arbitrary waveform that controls acousto-optic modulator 205 to produce a selected shifted frequency 208. Frequency drive signal 206 can be provided, e.g. by frequency controller 219 that can be, e.g., a RF sine generator or the like. Instead of a continuous waveform such as sine waveform, frequency drive signal 206 can be a stepped function or digital signal, e.g., a waveform includes a TTL level that occurs at a selected frequency to control shifted frequency 208 by acousto-optic modulator 205.

Laser Doppler vibrometer 201 can be in electrical communication with analyzer 212 that receives synthetic velocity shift 211 from laser Doppler vibrometer 201. Analyzer 212 can include a computer for data analysis and interfacing other electrical components for synchronization and other operations as well as an LDV controller.

Elements of calibration apparatus 200 can be various sizes that can be selected based on a compactness, operation wavelength, or operation environment. Elements of calibration apparatus 200 can be made of a material that is physically or chemically resilient in an environment in which calibration apparatus 200 is disposed. Exemplary materials include a metal, ceramic, thermoplastic, glass, semiconductor, and the like. The elements of calibration apparatus 200 can be made of the same or different material and can be monolithic in a single physical body or can be separate members that are physically joined.

Calibration apparatus 200 can be made in various ways. It should be appreciated that calibration apparatus 200 includes a number of optical, electrical, or mechanical components, wherein such components can be interconnected and placed in communication (e.g., optical communication, electrical communication, mechanical communication, and the like) by physical, chemical, optical, or free-space interconnects. The components can be disposed on mounts that can be disposed on a bulkhead for alignment or physical compartmentalization. As a result, calibration apparatus 200 can be disposed in a terrestrial environment or space environment. Optical elements of calibration apparatus 200 can be formed from quartz, fused silica, magnesium fluoride, and the like although other suitable materials, such glass, or metal selected for desired optical transmission, reflection, or filtering.

Calibration apparatus 200 has numerous advantageous and unexpected benefits and uses. In an embodiment, a process for calibrating a laser Doppler vibrometer with calibration apparatus 200, e.g., as configured in FIG. 1A, FIG. 1B, and FIG. 1C, includes: receiving, by bidirectional frequency shifter stage 222, primary laser light 202 from laser Doppler vibrometer 201, primary laser light 202 including primary frequency 203 and that is propagating in a forward propagation direction to bidirectional frequency shifter stage 222 from laser Doppler vibrometer 201; producing, by bidirectional frequency shifter stage 222 from primary laser light 202, frequency shifted light 207 including shifted frequency 208, such that shifted frequency 208 differs from primary frequency 203; communicating, in a forward propagation direction, frequency shifted light 207 from bidirectional frequency shifter stage 222 to reflector 216; receiving, by reflector 216, frequency shifted light 207 that propagates from bidirectional frequency shifter stage 222 to reflector 216 in the forward propagation direction; reflecting, by reflector 216, frequency shifted light 207 back to bidirectional frequency shifter stage 222 in reverse propagation direction; receiving, by bidirectional frequency shifter stage 222, frequency shifted light 207 reflected by reflector 216 that propagates from reflector 216 to bidirectional frequency shifter stage 222 in reverse propagation direction; producing, by bidirectional frequency shifter stage 222, secondary light 209 including secondary shifted frequency 210 from frequency shifted light 207 reflected by reflector 216, such that secondary shifted frequency 210 differs from shifted frequency 208 and from primary frequency 203; and communicating, secondary light 209 from bidirectional frequency shifter stage 222, to laser Doppler vibrometer 201 in reverse propagation direction, such that laser Doppler vibrometer 201 receives secondary light 209 from bidirectional frequency shifter stage 222 and produces synthetic velocity shift 211 from secondary light 209.

Figure 2A:
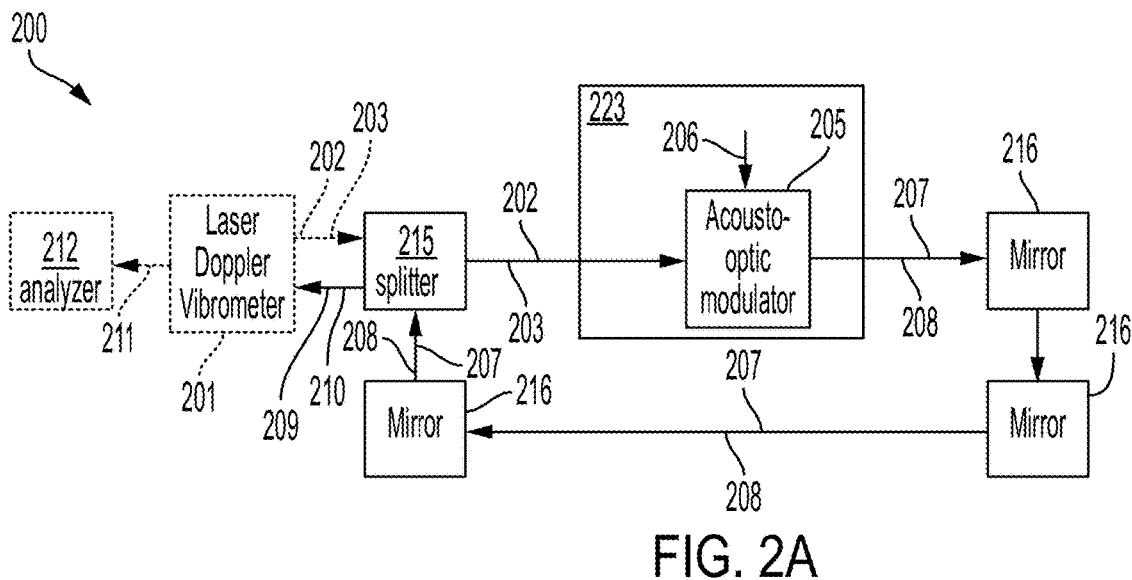
FIG. 2A shows a calibration apparatus that includes a monodirectional frequency shifter stage.
Figure 2B:
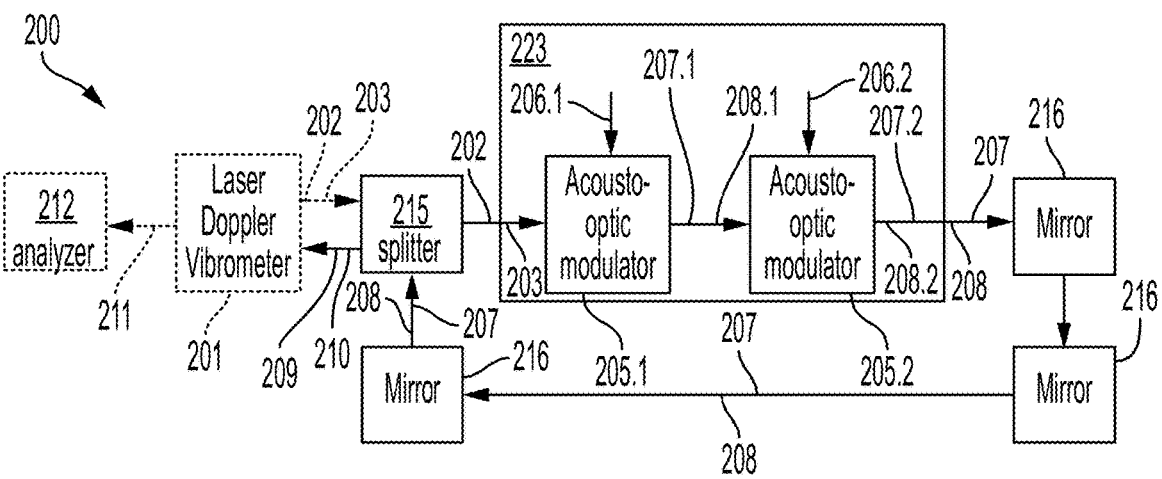
FIG. 2B shows a calibration apparatus that includes a monodirectional frequency shifter stage.
Figure 2C:
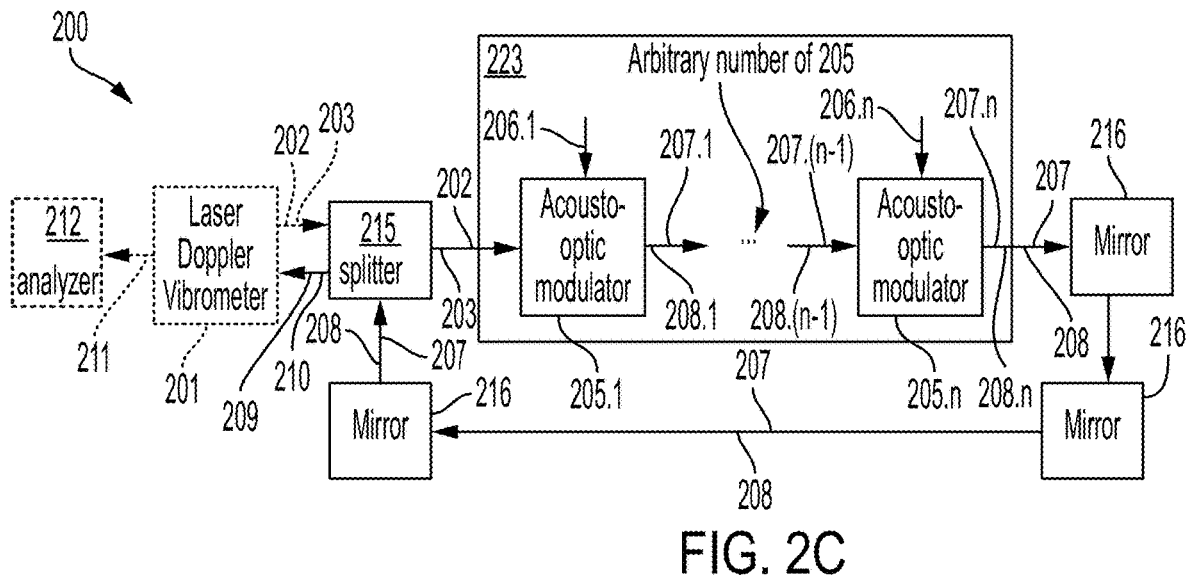
FIG. 2C shows a calibration apparatus that includes a monodirectional frequency shifter stage.
Figure 3:
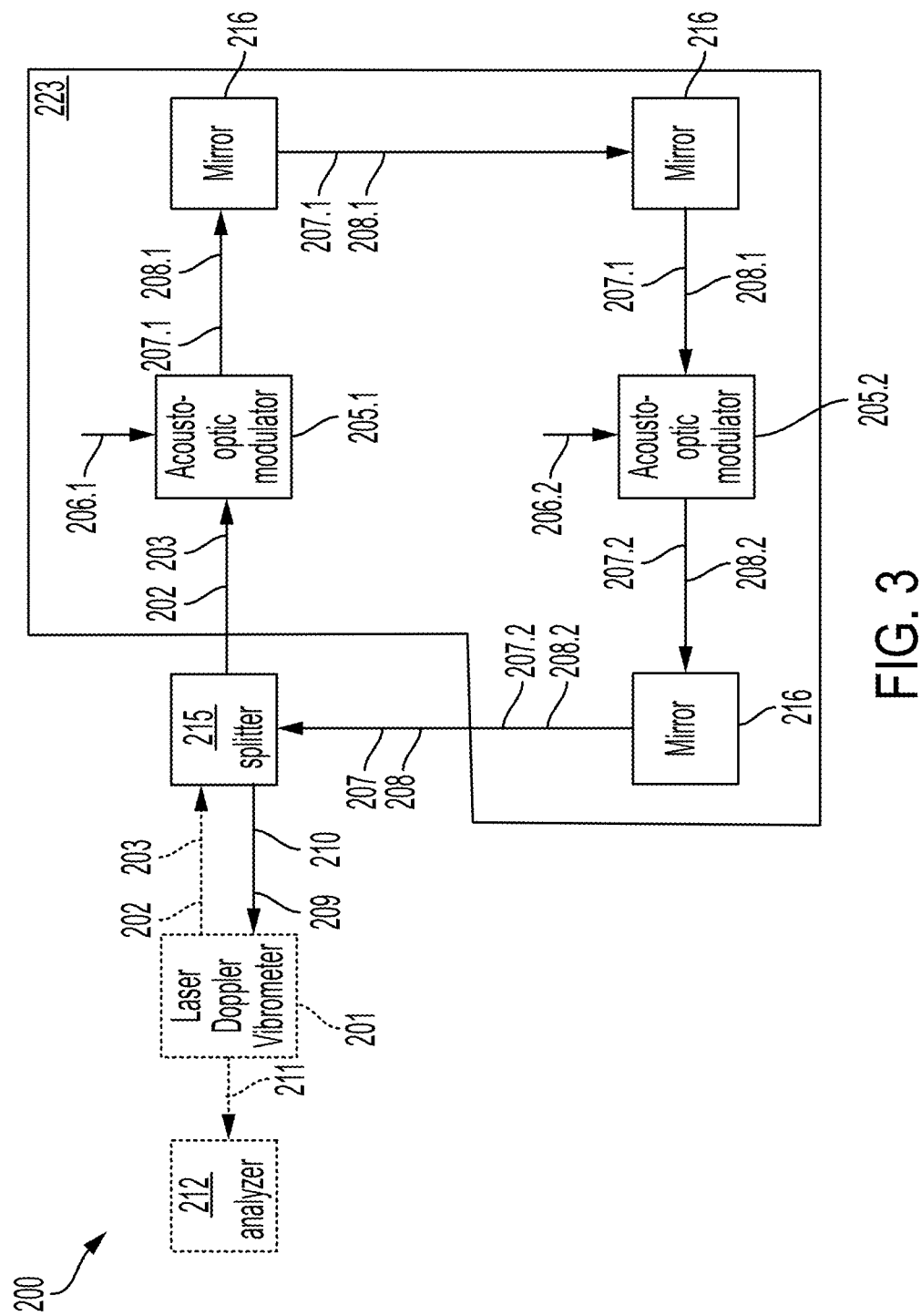
FIG. 3 shows a calibration apparatus that includes a monodirectional frequency shifter stage.
Figure 4A:
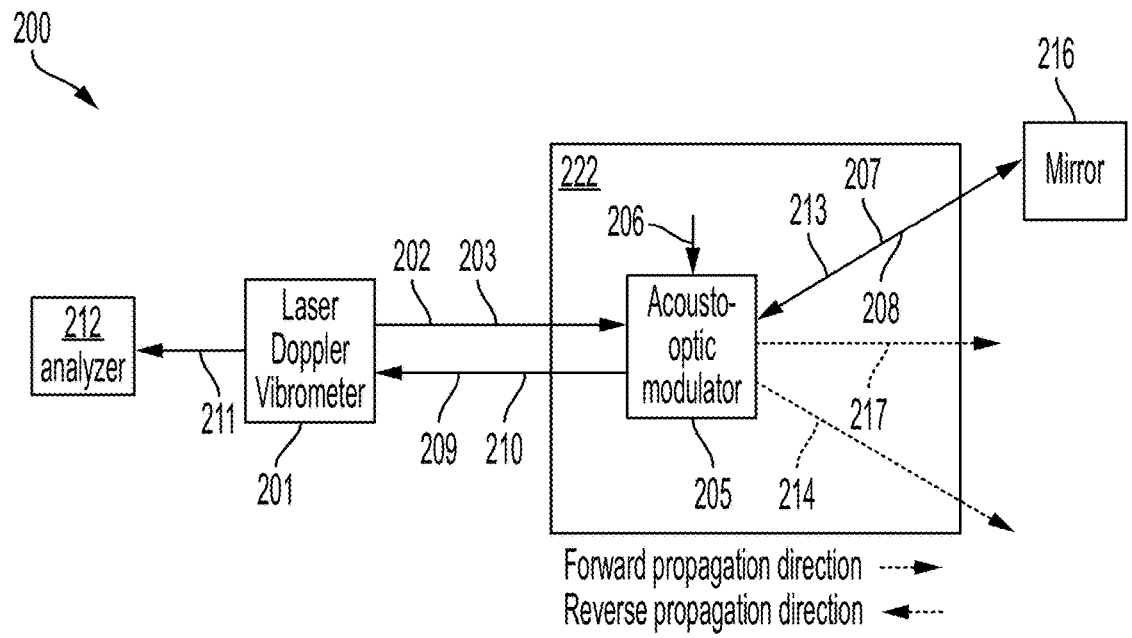
FIG. 4A shows a calibration apparatus that includes a bidirectional frequency shifter stage.
Figure 4B:
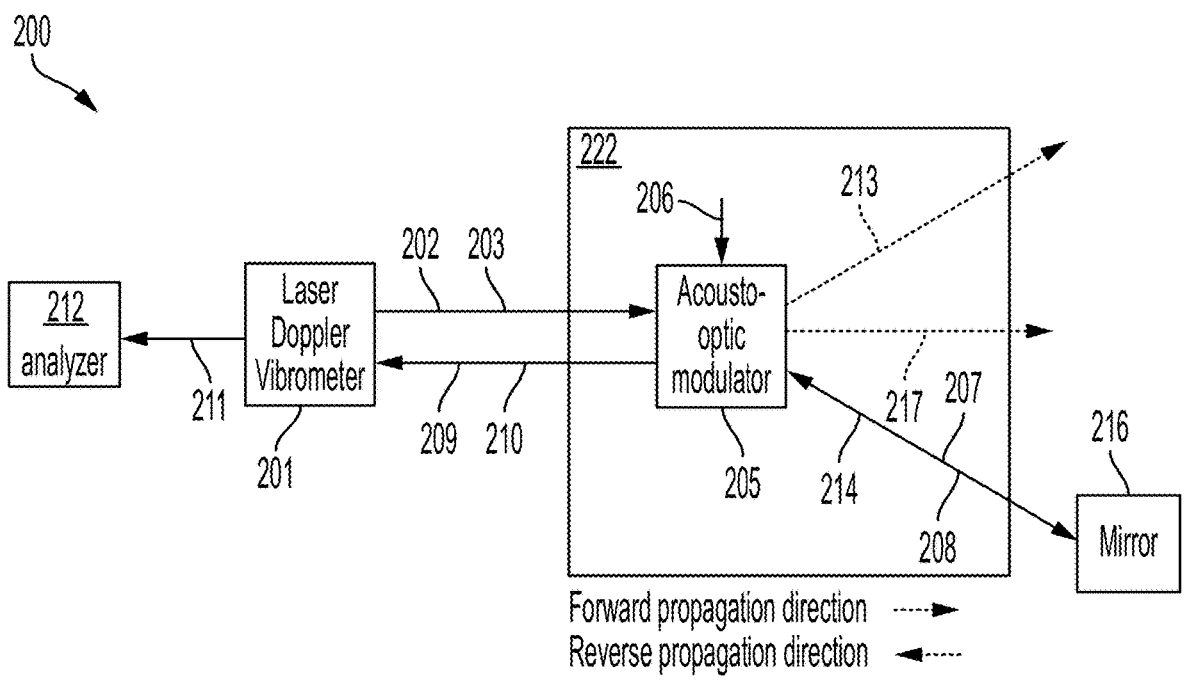
FIG. 4B shows a calibration apparatus that includes a bidirectional frequency shifter stage.

In an embodiment, a process for calibrating a laser Doppler vibrometer with calibration apparatus 200, e.g., as configured in FIG. 2A, FIG. 2B, and FIG. 2C, includes: receiving, by monodirectional frequency shifter stage 223, primary laser light 202 from laser Doppler vibrometer 201, primary laser light 202 including primary frequency 203; producing, by monodirectional frequency shifter stage 223 from primary laser light 202, frequency shifted light 207 including shifted frequency 208, such that shifted frequency 208 differs from primary frequency 203; communicating frequency shifted light 207 from bidirectional frequency shifter stage 222 to reflector 216; receiving, by reflector 216, frequency shifted light 207 from monodirectional frequency shifter stage 223; reflecting, by reflector 216, frequency shifted light 207 from monodirectional frequency shifter stage 223 to beam splitter 215; receiving, by beam splitter 215, primary laser light 202 from laser Doppler vibrometer 201; communicating, by beam splitter 215, primary laser light 202 to monodirectional frequency shifter stage 223; receiving, by beam splitter 215, frequency shifted light 207 from reflector 216; and communicating frequency shifted light 207 as secondary light 209 to laser Doppler vibrometer 201 from beam splitter 215, such that laser Doppler vibrometer 201 receives secondary light 209 from beam splitter 215 and produces synthetic velocity shift 211 from secondary light 209. FIG. 2A shows monodirectional frequency shifter stage 223 that includes an accousto optic modulator. FIG. 2B shows monodirectional frequency shifter stage 223 that includes a plurality accousto optic modulators (e.g., two accousto optical modulators). FIG. 2C shows monodirectional frequency shifter stage 223 that includes a plurality of accousto optic modulator (e.g., an arbitrary number of accousto optic modulator indicated by 206.1, 206.n–1, 206.n, where n is an arbitrary integer).

In an embodiment, synthetic velocity shift 211 is analyzed for calibration of laser Doppler vibrometer 201 by, for example, adjusting calibration settings within the LDV to match the synthetic velocities produced by the apparatus or by using a calibration curve in the analyzer to convert the readings from the LDV to match the synthetic velocities produced by the apparatus.

Calibration apparatus 200 and processes disclosed herein have numerous beneficial uses, including the ability to perform a primary calibration instead of the current practice that follows the ISO standard practice of a secondary calibration based on a comparison measurement which has a higher associated calibration uncertainty, the ability for a user to perform a calibration in their own laboratory instead of sending the LDV to a calibration laboratory thereby reducing its downtime, the ability to simulate arbitrary velocity profiles to characterize the response of the LDV as, for example, determining experimentally the bandwidth of the LDV, which can result in documenting a wider range of operation than what is specified by the manufacturer which is especially important for transient or shock measurements. Advantageously, calibration apparatus 200 overcomes limitations and technical deficiencies of conventional devices and conventional processes such as the ability to perform a primary calibration of the LDV, the ability to create a field portable calibration device, and the ability to apply well defined arbitrary velocity profiles to characterize the performance of the LDV. Further, the apparatus could be integrated within the LDV so that a self-calibration could be carried out before its use and to verify its function. Conventional methods are not as accurate for calibrating a laser Doppler vibrometer described herein and do not provide a method for internal calibration. Accordingly, calibration apparatus 200 can provide higher precision and accuracy than conventional devices.

Calibration apparatus 200 and processes herein unexpectedly allows a user to perform a primary calibration of the LDV instead of the conventional secondary calibration that requires a laser interferometer and a shaker, and the ability to apply well defined arbitrary velocity profiles. Moreover, calibration apparatus 200 provides the ability to perform primary calibrations in the field.

The articles and processes herein are illustrated further by the following Examples, which are non-limiting.

EXAMPLES

Example 1

In this Example, a process to characterize performance of a laser Doppler vibrometer (LDV) uses two acousto-optic modulators to frequency shift the light from an LDV by a known quantity to create a synthetic velocity shift that is traceable to a frequency reference. Results are presented for discrete velocity shifts and for sinusoidal velocity shifts that would be equivalent to what would be observed in an ideal accelerometer vibration calibration. The method also enables the user to sweep the synthetic vibration excitation frequency to characterize the bandwidth of an LDV together with its associated electronics.

Following ISO Standard 16063-41, laser Doppler vibrometers (LDVs) are calibrated by a comparison-type measurement to a laser homodyne interferometer that is defined as the primary standard. Not covered by ISO 16063-41, but for the case where all the components of the LDV system and their associated uncertainties are known, methods can be employed for the direct determination of measurement uncertainty of the LDV or by using a combination of a heterodyne with a homodyne-quadrature configuration.

Technology for manufacturing commercial LDV systems has matured as well as their use in commercially available primary vibration calibration systems. These systems involve calibration by the manufacturer over a periodic time interval that is typically one year and are traceable to the Système International d'Unités (SI) through the manufacturer. Conventional LDV systems can have a design and internal components that may not be known in detail by the user. Therefore, following an uncertainty determination approach may not be possible for such black box systems if their internal workings are proprietary. Accordingly, conventional calibration of such LDV follow ISO 16063-41 with comparison to a primary heterodyne system and results in the LDV system being a secondary system.

A challenge therefore remains in the adoption of cost-effective calibration systems for commercial LDVs by National Measurement Institutes (NMIs) and other calibration laboratories, who are responsible for direct determination of uncertainty. Calibration of laser Doppler vibrometers using shock excitations and total distance traveled characterizes the entire measurement system under the same conditions that would be used in an accelerometer shock calibration and could be included as part of the accelerometer shock calibration. However, a drawback of the method is that it does not characterize the frequency response and bandwidth of the LDV. In accelerometer shock calibrations using LDVs the bandwidth of the excitation should not exceed the bandwidth of the LDV to produce accurate accelerometer calibration. The calibration apparatus and process in this Example characterizes the bandwidth of the LDV system.

FIG. 9 shows the calibration apparatus is an acousto-optic modulator (AOM)-based LDV characterization system design. The laser light passes through a 50-50 beam splitter, then through a collimator, after which it is focused into the aperture of the first AOM. This AOM is driven at frequency f, shifting the frequency of the laser light down by f. The beam is then redirected by two mirrors to turn it back towards the LDV where it is focused to pass through the second AOM, where the laser light is shifted up by frequency f+δ, where δ is the Doppler shift in frequency that we wish to simulate. Finally, the beam is directed back into LDV by a third mirror back though the 50-50 beam splitter. Two AOMs produce the net frequency shift δ, wherein a single AOM does not generate small frequency shifts of less than a MHz as used herein.

The velocity v detected by the LDV is related to the Doppler frequency shift δ and the wavelength of the laser by the Doppler relationship:

$$v = \lambda \delta, \tag{1}$$

wherein the laser wavelength λ=632.81 nm.

Figure 11:
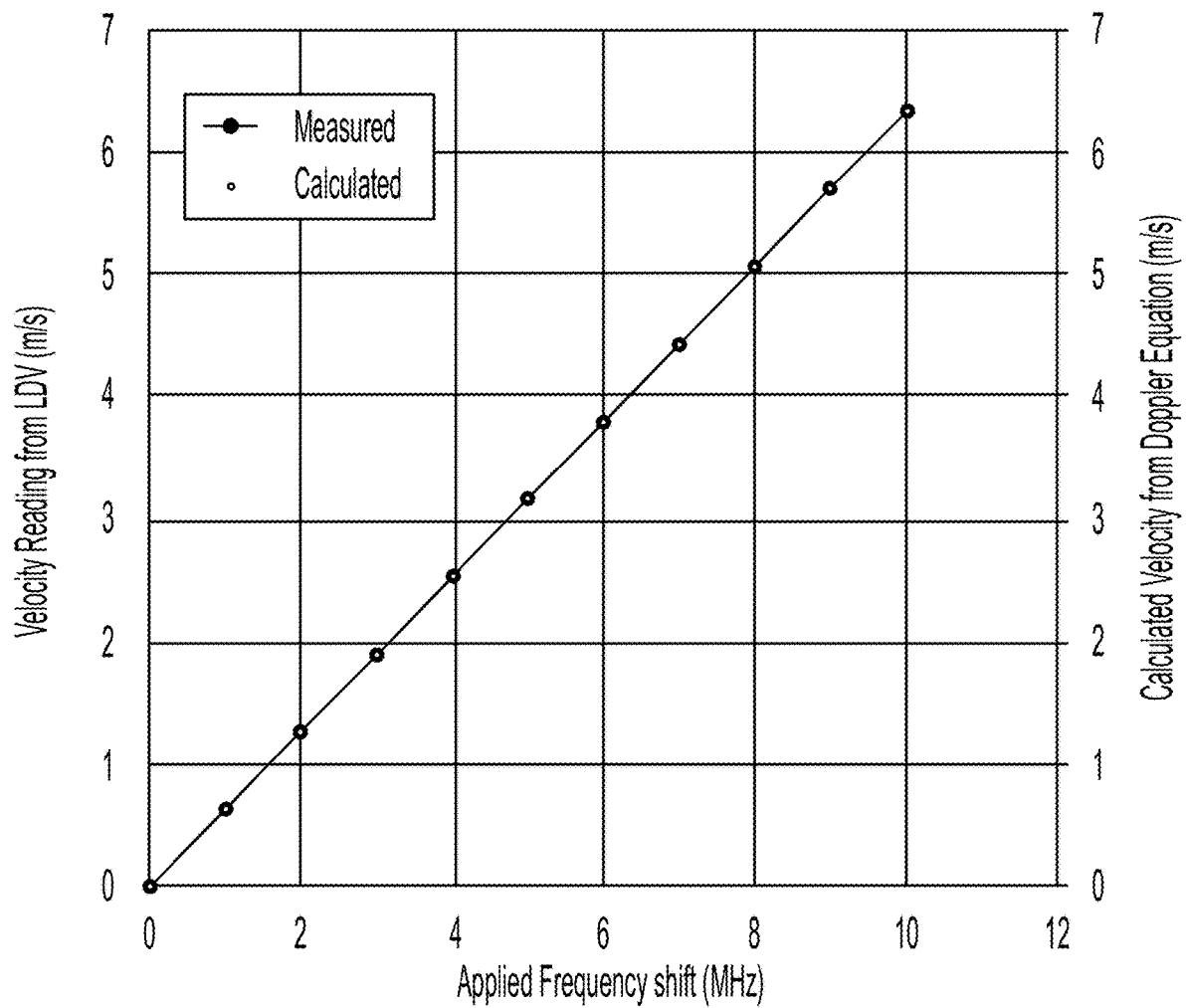
FIG. 11 shows a plot of velocity reading from the LDV (left vertical axis, blue points) and calculated velocity (right vertical axis, orange points) as a function of the frequency shift of the primary laser light, corresponding to a synthetic velocity shift according to Example 1.

Results were obtained using an LDV system interfaced with the configuration shown in FIG. 9. The AOMs were driven by two separate sinusoidal RF signal generators. The time bases of which were synchronized by their 10 MHz in/out connections at a frequency modulation (FM) that produced sinusoidal frequency modulated waveforms using a third signal generator. The signals from RF signal generators were amplified using RF amplifiers connected to each of the AOMs. The base frequency f was selected to be 80 MHz for convenience. FIG. 11 shows the relationship between the frequency shift δ, the reported velocity from the LDV, and the calculated velocity using the Doppler equation (1).

Figure 10:
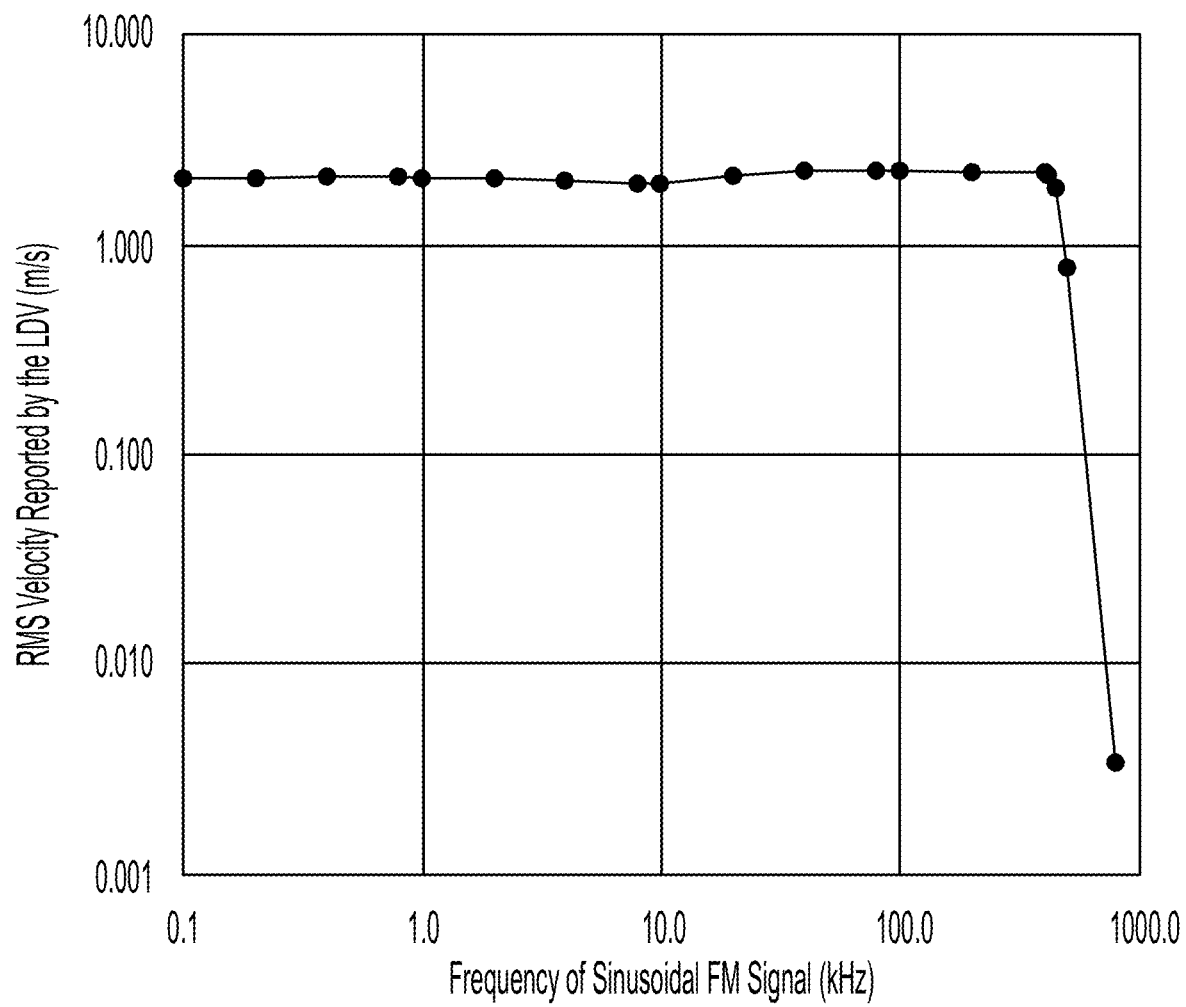
FIG. 10 shows a plot of the RMS velocity reading from the LDV in relation to the frequency of FM sinusoidal excitation according to Example 1. Here AOMs simulate conditions of an ideal shaker that is swept in frequency from 100 Hz to 1 MHz with a constant RMS velocity. LDV response roll off occurs at 500 kHz.

FIG. 10 shows the FM result of a sinusoidal signal with a modulation frequency between 100 Hz to 1 MHz. This result is equivalent to what the LDV system would observe for an ideal shaker that was being swept in frequency with an excitation controlled to be a constant RMS velocity and can be used to characterize the frequency of the LDV. The roll off that is observed at 500 kHz indicates the bandwidth of the entire LDV system. The LDV system included a digital acquisition system to record results as well as an analog output that produced an output voltage proportional to velocity by the factor of 5 mm/s per Volt.

Data in FIG. 10 show that this approach characterizes the bandwidth of an LDV as a system together with its acquisition and control electronics and amplifiers. The frequency shift could be measured with a photodiode rather than from the signal generators driving the AOMs. This could capture any offsets or fluctuations between the drivers and the light entering the LDV, e.g., due to refractive index fluctuation. The collimator could be disposed before the beam splitter.

Example 2

FIG. 12 shows a calibration apparatus with a bidirectional frequency shifter stage that includes acousto-optic modulators (AOM), wherein laser light is collimated using 300 mm and 30 mm lenses to create a beam diameter compatible with the aperture of the AOMs. The light beam passes through the first AOM where it is downshifted in frequency, f. Next, it passes through the second AOM where it is upshifted by a frequency f+d. The beam is then reflected back along its path with a mirror in a reverse propagation direction, doubling the effect of the AOMs, and delivering light to the LDV that is shifted in frequency by:

$$2\delta = 2(f + \delta - f). \tag{1}$$

Two AOMs produce the frequency shift that a single AOM cannot generate such as frequency shifts of order 1 MHz or less. In this configuration, the velocity v obtained by the LDV is provided by the Doppler equation with a frequency shift of 2δ and the wavelength of the laser by the relationship:

$$v = 1/2\lambda(2\delta) = \lambda\delta, \tag{2}$$

wherein laser wavelength λ=632.81 nm.

Results were obtained with an LDV system that was interfaced with a bidirectional frequency shifter stage 222 with the configuration shown in FIG. 12. The AOMs were driven by two sinusoidal radio frequency (RF) signal generators. A digital multimeter measured root mean squared (RMS) voltage for sinusoidal excitations. The signals from the RF signal generators were amplified using amplifiers connected to each of the AOMs. The base frequency f was selected to be 110 MHZ, corresponding to the center frequency of the AOMs. The zero frequency (DC) and transient velocity readings were obtained with a DAQ, and the RMS readings were obtained with an RMS multimeter.

Figure 13:
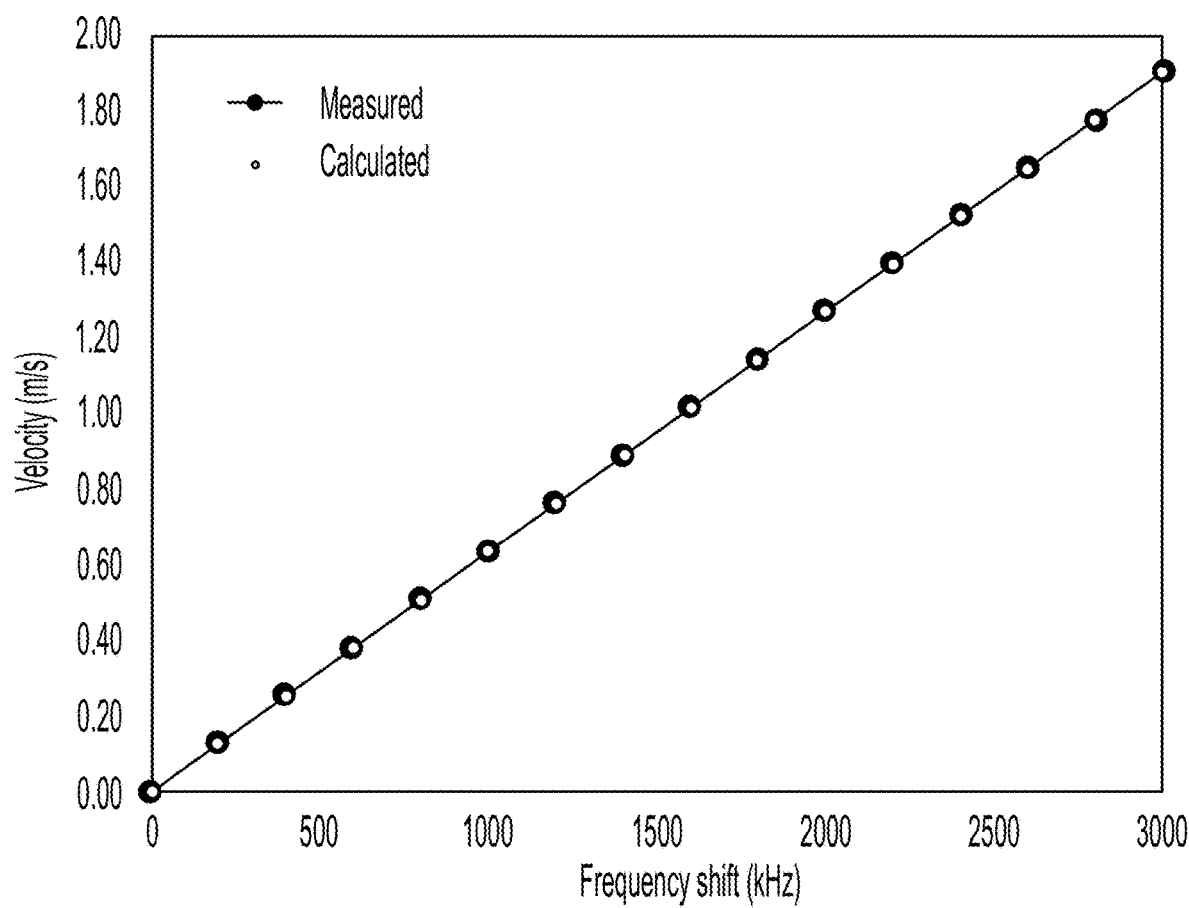
FIG. 13 shows a plot of the velocity determined by the LDV as a function of frequency shift $\delta$ in and corresponding calculated values using the Doppler equation according to Example 2.

FIG. 13 shows the relationship between the frequency shift δ, the reported velocity from the LDV, and the calculated velocity using the Doppler equation (2). These results were obtained with an amplification factor of 0.5 m/s/V. The resulting dc voltage was sampled 2048 times at 204800 samples/s with no filtering. The data were averaged, and the standard deviation was determined. The LDV exhibited a 0.0012 m/s offset when directed onto a non-moving surface without the AOMs in the beam path as well as when the frequency shift δ was set to zero. This offset was subtracted from the measured results.

Data in FIG. 12 is replotted in FIG. 13 in terms of the percent difference between the velocity reported by the LDV (with the offset subtracted) and the calculated velocity from the Doppler shift equation (2). The data show a maximum percent difference of ±0.04% over the frequency range that was tested.

Figure 14:
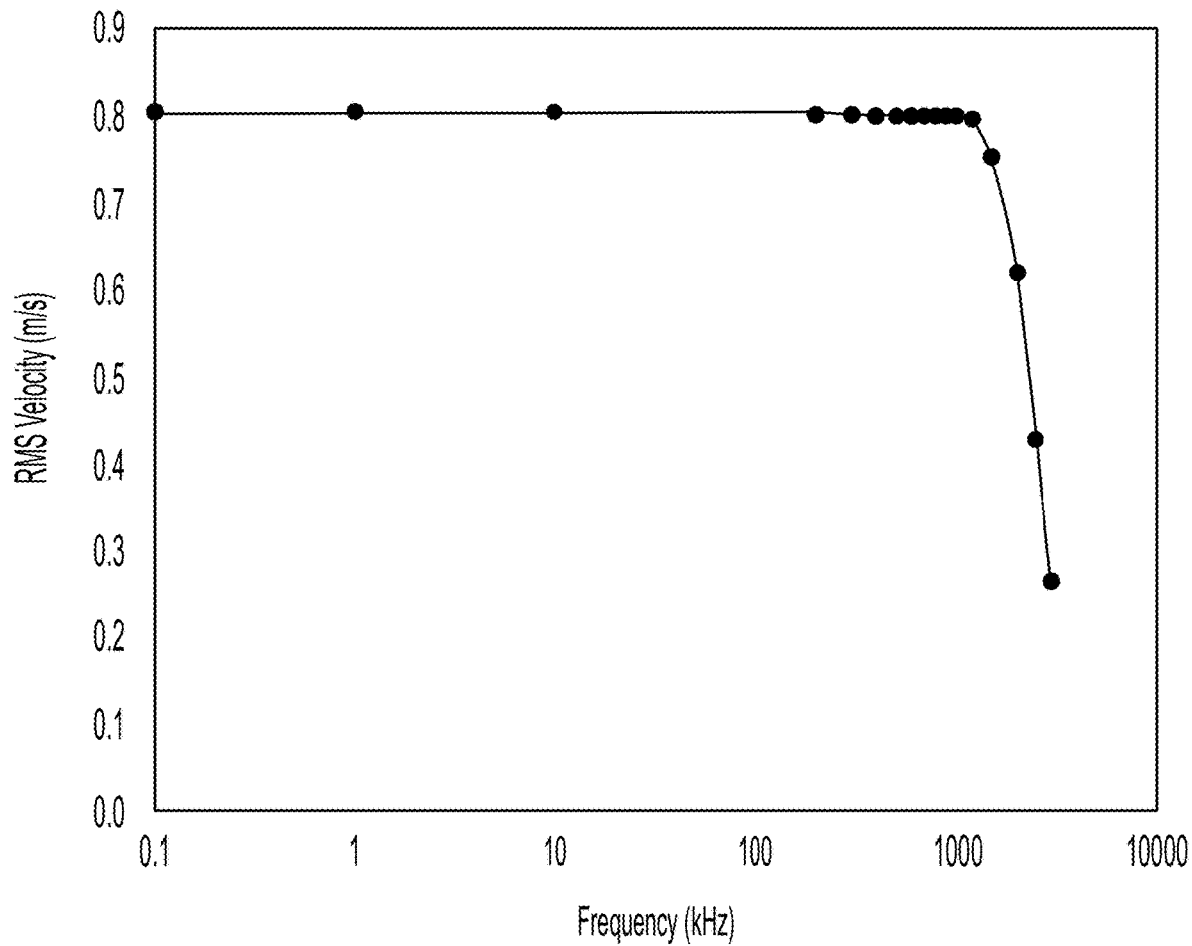
FIG. 14 shows a frequency response of the LDV using sinusoidal frequency modulation of a second AOM that produces a synthesized vibration measurement condition according to Example 2.
Figure 15:
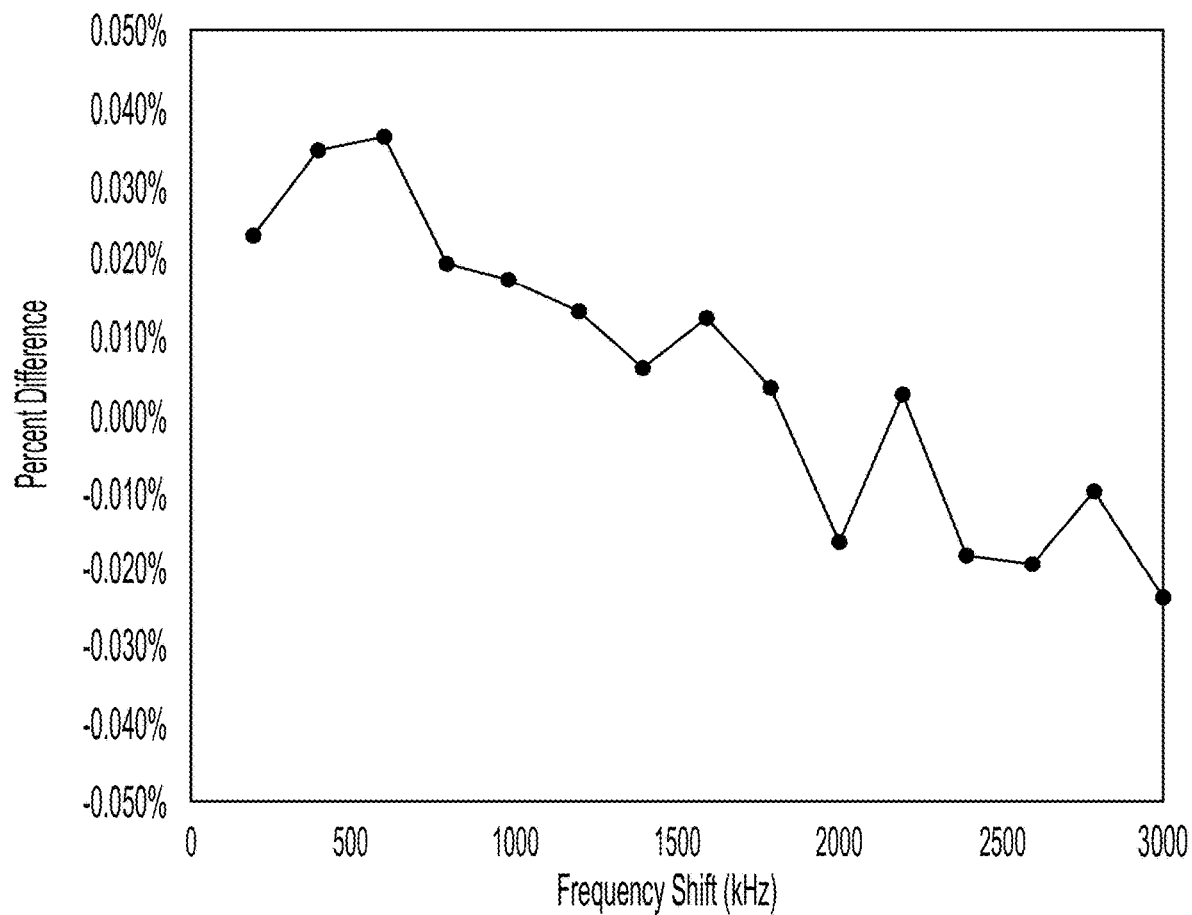
FIG. 15 shows a plot of the RMS velocity reading from the LDV in relation to the frequency according to Example 2.

Regarding results for sinusoidal excitation, the second AOM was excited using an RF signal generator with a sinusoidal frequency modulation to create a synthesized vibration measurement. An object of the Example is characterization of the bandwidth of the LDV system. The root mean squared (RMS) voltage from the analog output of the vibrometer controller was measured using the RMS multimeter and converted to RMS velocity using a gain factor of 0.5 m/s/V. The sinusoidal modulation at the 110 MHz base frequency was swept from 100 Hz to 3 MHz. FIG. 14 shows that the LDV vibrometer controller had a uniform response up to 1 MHz and drops off beyond that frequency.

Figure 16:
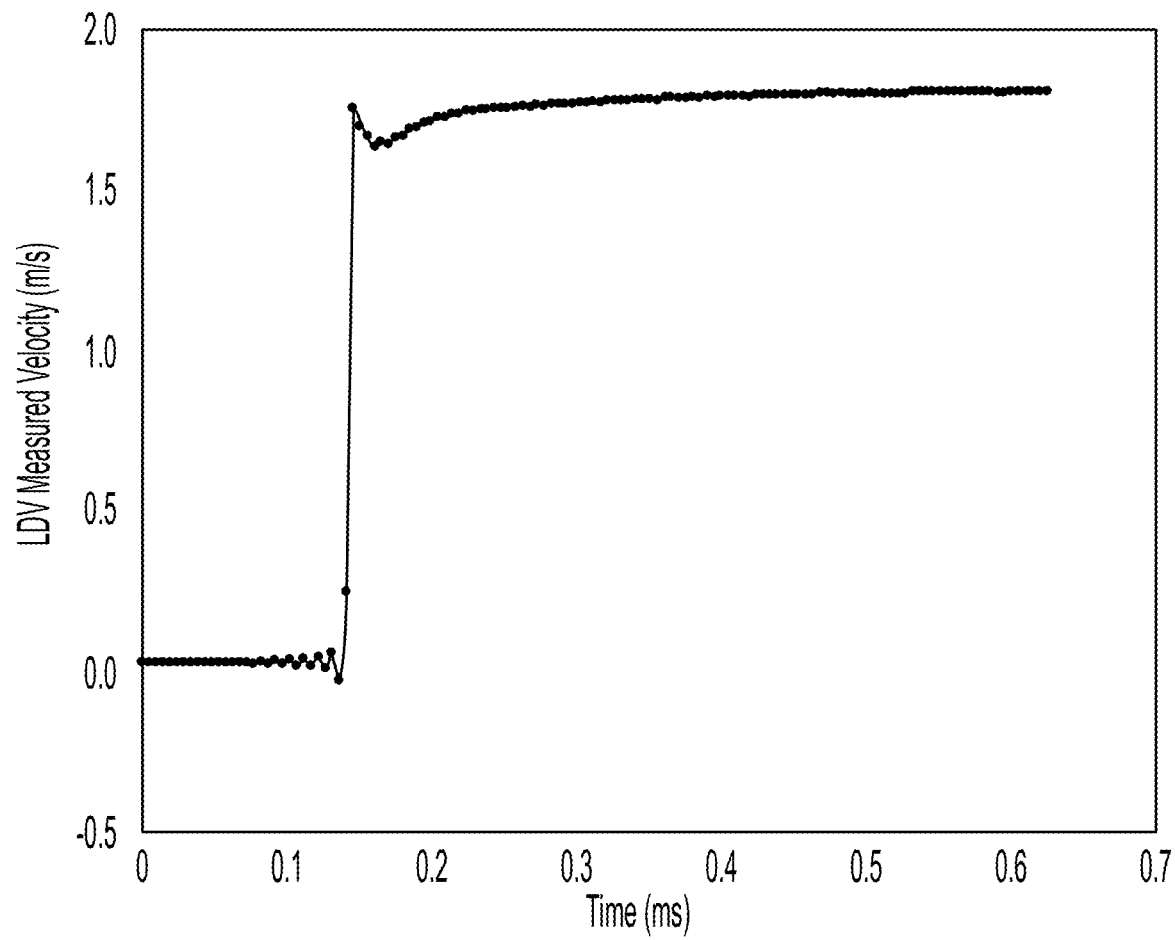
FIG. 16 shows a percent difference between the velocity reported by the LDV with offset subtracted and the calculated velocity using the Doppler shift equation according to Example 2.

Regarding velocity step function excitation, the second AOM was excited using an 10 MHz-50 GHz RF swept signal generator to frequency modulate an arbitrary analog signal. An arbitrary waveform generator produced a 1 Hz square wave alternating from 0 to 300 mV for frequency modulation to simulate a step function for synthesized velocity. The analog velocity signal from the vibrometer controller was digitized at a data acquisition sampling rate of 204800 samples/s. The resulting responses shown in FIG. 16 include effects of the LDV as well as the digital acquisition system, which would be expected to have a maximum bandwidth of 102400 Hz.

Results show that calibrating a laser Doppler vibrometer with the calibration apparatus characterized DC, sinusoidal steady state, and transient response of an LDV as a system as a whole, together with its data acquisition and control electronics and amplifiers. The DC response exhibited a maximum of ±0.04% difference between the instrument-reported value and the calculated value based on the Doppler equation, within the 1% accuracy specified by the manufacturer. The LDV system bandwidth of 1 MHZ determined by sinusoidal excitations agreed with manufacturer's specification. The velocity step function experiment shows creation of complex velocity profiles to test the response of the LDV together with its data acquisition, control electronics, and amplifiers.

While one or more embodiments have been shown and described, modifications and substitutions may be made thereto without departing from the spirit and scope of the invention. Accordingly, it is to be understood that the present invention has been described by way of illustrations and not limitation. Embodiments herein can be used independently or can be combined.

All ranges disclosed herein are inclusive of the endpoints, and the endpoints are independently combinable with each other. The ranges are continuous and thus contain every value and subset thereof in the range. Unless otherwise stated or contextually inapplicable, all percentages, when expressing a quantity, are weight percentages. The suffix (s) as used herein is intended to include both the singular and the plural of the term that it modifies, thereby including at least one of that term (e.g., the colorant(s) includes at least one colorants). Option, optional, or optionally means that the subsequently described event or circumstance can or cannot occur, and that the description includes instances where the event occurs and instances where it does not. As used herein, combination is inclusive of blends, mixtures, alloys, reaction products, collection of elements, and the like.

As used herein, a combination thereof refers to a combination comprising at least one of the named constituents, components, compounds, or elements, optionally together with one or more of the same class of constituents, components, compounds, or elements.

All references are incorporated herein by reference.

The use of the terms "a," "an," and "the" and similar referents in the context of describing the invention (especially in the context of the following claims) are to be construed to cover both the singular and the plural, unless otherwise indicated herein or clearly contradicted by context. It can further be noted that the terms first, second, primary, secondary, and the like herein do not denote any order, quantity, or importance, but rather are used to distinguish one element from another. It will also be understood that, although the terms first, second, etc. are, in some instances, used herein to describe various elements, these elements should not be limited by these terms. For example, a first current could be termed a second current, and, similarly, a second current could be termed a first current, without departing from the scope of the various described embodiments. The first current and the second current are both currents, but they are not the same condition unless explicitly stated as such.

The modifier about used in connection with a quantity is inclusive of the stated value and has the meaning dictated by the context (e.g., it includes the degree of error associated with measurement of the particular quantity). The conjunction or is used to link objects of a list or alternatives and is not disjunctive; rather the elements can be used separately or can be combined together under appropriate circumstances.

What is claimed is:

1. A calibration apparatus for calibrating a laser Doppler vibrometer, the calibration apparatus comprising:
    a monodirectional frequency shifter stage in optical communication with the laser Doppler vibrometer and that:
        receives, from the laser Doppler vibrometer, primary laser light comprising a primary frequency;
        produces, from the primary laser light, frequency shifted light comprising a shifted frequency, such that the shifted frequency differs from the primary frequency;
        communicates the frequency shifted light from the monodirectional frequency shifter stage to a reflector;
    the reflector in optical communication with the monodirectional frequency shifter stage and that:
        receives frequency shifted light from the monodirectional frequency shifter stage; and
        reflects the frequency shifted light from the monodirectional frequency shifter stage to a beam splitter; and
    the beam splitter in optical communication with the monodirectional frequency shifter stage and the reflector and that:
        receives the primary laser light from the laser Doppler vibrometer;
        communicates the primary laser light to the monodirectional frequency shifter stage;
        receives the frequency shifted light from the reflector; and
        communicates the frequency shifted light as secondary light to the laser Doppler vibrometer, such that the laser Doppler vibrometer receives the secondary light from the beam splitter and produces a synthetic velocity shift from the secondary light.

2. The calibration apparatus of claim 1, further comprising the laser Doppler vibrometer in optical communication with an acousto-optic modulator and that produces the primary laser light and receives the secondary light from the beam splitter.

3. The calibration apparatus of claim 1, wherein the monodirectional frequency shifter stage is optically interposed between the laser Doppler vibrometer and the reflector.

4. The calibration apparatus of claim 1, further comprising an analyzer in electronic communication with the laser Doppler vibrometer and that receives the synthetic velocity shift from the laser Doppler vibrometer.

5. The calibration apparatus of claim 4, wherein the analyzer determines a calibration of the laser Doppler vibrometer from the synthetic velocity shift.

6. The calibration apparatus of claim 1, wherein the monodirectional frequency shifter stage comprises an acousto-optic modulator that:
receives the primary laser light;
receives a frequency drive signal; and
produces the frequency shifted light from the primary laser light, based on the frequency drive signal.

7. The calibration apparatus of claim 1, wherein the monodirectional frequency shifter stage comprises a plurality of acousto-optic modulators.

8. The calibration apparatus of claim 7, wherein the acousto-optic modulators are connected optically in serial to one another, such that an optical input of each acousto-optic modulator is an optical output of another acousto-optic modulator in the monodirectional frequency shifter stage, except for a first acousto-optic modulator that receives the primary laser light.

9. The calibration apparatus of claim 1, wherein the shifted frequency is a positive frequency shift component.

10. The calibration apparatus of claim 1, wherein the shifted frequency is a negative frequency shift component.

11. A process for calibrating a laser Doppler vibrometer, the process comprising:

receiving, by a monodirectional frequency shifter stage, primary laser light from the laser Doppler vibrometer, the primary laser light comprising a primary frequency;

producing, by the monodirectional frequency shifter stage from the primary laser light, frequency shifted light comprising a shifted frequency, such that the shifted frequency differs from the primary frequency;

communicating the frequency shifted light from the monodirectional frequency shifter stage to a reflector;

receiving, by the reflector, the frequency shifted light from the monodirectional frequency shifter stage;

reflecting, by the reflector, the frequency shifted light from the monodirectional frequency shifter stage to a beam splitter;

receiving, by the beam splitter, the primary laser light from the laser Doppler vibrometer;

communicating, by the beam splitter, the primary laser light to the monodirectional frequency shifter stage;

receiving, by the beam splitter, the frequency shifted light from the reflector; and communicating the frequency shifted light as secondary light to the laser Doppler vibrometer from the beam splitter, such that the laser Doppler vibrometer receives the secondary light from the beam splitter and produces a synthetic velocity shift from the secondary light.

\* \* \* \* \*